(12) United States Patent
Garrecht et al.

(10) Patent No.: US 6,571,249 B1
(45) Date of Patent: May 27, 2003

(54) MANAGEMENT OF QUERY RESULT COMPLEXITY IN HIERARCHICAL QUERY RESULT DATA STRUCTURE USING BALANCED SPACE CUBES

(75) Inventors: Thomas Garrecht, Munich (DE); Axel Loritz, Tutzing (DE); Anton Weiss, Altdorf (DE)

(73) Assignee: Siemens Aktiengesellschaft, Munich (DE)

( * ) Notice: Subject to any disclaimer, the term of this patent is extended or adjusted under 35 U.S.C. 154(b) by 224 days.

(21) Appl. No.: 09/669,888

(22) Filed: Sep. 27, 2000

(51) Int. Cl.[7] ............................ G06F 7/00; G06F 17/00
(52) U.S. Cl. ...................................... 707/100; 707/102
(58) Field of Search ................................. 707/100, 102

(56) References Cited

U.S. PATENT DOCUMENTS 5,701,467 A * 12/1997 Freeston ..................... 395/611
5,754,938 A * 5/1998 Herz et al. ................... 455/4.2

* cited by examiner

Primary Examiner—Safet Metjahic
Assistant Examiner—Cindy Nguyen
(74) Attorney, Agent, or Firm—Sughrue Mion, PLLC

(57) ABSTRACT

A method, system, computer program product, server, and interface for managing query results includes receiving query results and semantic structuring information, and defining a root node corresponding to the query to which the results relate. A semantically structured tree descending from a root node has intermediate nodes in layers according to the semantic structuring information. The leaf nodes each correspond to a query result. The leaf nodes are attached to the tree based on an uptree relation. The tree has a space cube structure balanced on the basis of a semantic threshold.

10 Claims, 19 Drawing Sheets

Fig. 3

| Category | Min | Max | Value |
|----------|-----|-----|-------|
| animal | | | ostrich, eagle |
| usage | | | decoration, ornament, adornment, embellishment |
| material | | | feather, plume, quill |

| Result | Information |
|---|---|
| 900 | ostrich, feather, ornament |
| 901 | ostrich, feather, ornament |
| 902 | ostrich, quill, decoration |
| 903 | ostrich, quill, ornament |
| 904 | ostrich, quill, adornment |
| 905 | ostrich, quill, embellishment |
| 906 | ostrich, quill, embellishment |
| 907 | ostrich, quill, embellishment |
| 908 | ostrich, plume, decoration |
| 909 | eagle, feather, ornament |
| 910 | eagle, feather, decoration |
| 911 | eagle, feather, adornment |
| 912 | eagle, feather, adornment |
| 913 | eagle, feather, adornment |
| 914 | eagle, quill, ornament |
| 915 | eagle, quill, ornament |

Fig. 5

| Result | Information |
|---|---|
| 900 | ostrich, feather, ornament |
| 901 | ostrich, feather, ornament |
| 902 | ostrich, quill, decoration, antique |
| 903 | ostrich, quill, decoration, armchair |
| 904 | ostrich, quill, decoration, armoire |
| 905 | ostrich, quill, decoration, bed |
| 906 | ostrich, quill, decoration, bunk bed |
| 907 | ostrich, quill, decoration, chair |
| 908 | ostrich, quill, decoration, cot |
| 909 | ostrich, quill, decoration, couch |
| 910 | ostrich, quill, decoration, cradle |
| 911 | ostrich, quill, decoration, daybed |
| 912 | ostrich, quill, decoration, divan |
| 913 | ostrich, quill, decoration, furniture |
| 914 | ostrich, quill, decoration, murphy |
| 915 | ostrich, quill, decoration, recliner |
| 916 | ostrich, quill, decoration, seat |
| 917 | ostrich, quill, decoration, settee |
| 918 | ostrich, quill, decoration, sofa |
| 919 | ostrich, quill, ornament |
| 920 | ostrich, quill, adornment |
| 921 | ostrich, quill, embellishment |
| 922 | ostrich, quill, embellishment |
| 923 | ostrich, quill, embellishment |
| 924 | ostrich, plume, decoration |
| 925 | eagle, feather, ornament |
| 926 | eagle, feather, decoration |
| 927 | eagle, feather, adornment |
| 928 | eagle, feather, adornment |
| 929 | eagle, feather, adornment |
| 930 | eagle, quill, ornament |
| 931 | eagle, quill, ornament |

Fig. 19

```
┌ ─ ─ ─ ─ ─ ─ ─ ─ ─ ─ ─ ─ ─ ─ ─ ─ 2000 ┐
| Node: 0
| Type: root                                    |
| Fanout: 1.0, 1.1
└ ─ ─ ─ ─ ─ ─ ─ ─ ─ ─ ─ ─ ─ ─ ─ ─ ─ ─ ┘
┌ ─ ─ ─ ─ ─ ─ ─ ─ ─ ─ ─ ─ ─ ─ ─ ─ 2010 ┐
| Node: 1.0
| Type: intermediate                            |
| Fanout: 2.0, 2.1, 2.2
| Category: animal                              |
| Value: ostrich
|                                               |
| Node: 1.1
| Type: intermediate                            |
| Fanout: 2.3, 2.4
| Category: animal                              |
| Value: eagle
|                                               |
| Node: 2.1
| Type: intermediate                            |
| Fanout: 3.1, 3.2, 3.3, 3.4
| Category: material                            |
| Value: quill
|                                               |
| Node: 3.14
| Type: intermediate                            |
| Fanout: 4.12, 4.13
| Category: usage                               |
| Value: di-f
└ ─ ─ ─ ─ ─ ─ ─ ─ ─ ─ ─ ─ ─ ─ ─ ─ ─ ─ ┘
┌ ─ ─ ─ ─ ─ ─ ─ ─ ─ ─ ─ ─ ─ ─ ─ ─ 2020 ┐
| Node: 4.12
| Type: infoelement                             |
| URL: ...
| Weight: 39                                    |
| Category-values: (animal/ostrich), (material/quill), (usage/decoration)
| Meta-information: divan                       |
└ ─ ─ ─ ─ ─ ─ ─ ─ ─ ─ ─ ─ ─ ─ ─ ─ ─ ─ ┘
```

MANAGEMENT OF QUERY RESULT COMPLEXITY IN HIERARCHICAL QUERY RESULT DATA STRUCTURE USING BALANCED SPACE CUBES

CROSS REFERENCE TO RELATED APPLICATIONS

This application is related to each of the following copending applications:

Application Ser. No. 09/669,892, entitled "MANAGEMENT OF QUERY RESULT COMPLEXITY USING WEIGHTED CRITERIA FOR HIERARCHICAL DATA STRUCTURING", filed on Sep. 27, 2000 (referred to herein as a first related application).

Application Ser. No. 09/669,889, entitled "PRESENTATION OF HIERARCHICAL QUERY RESULT DATA USING MULTIPLE DEGREES OF FREEDOM", filed on Sep. 27, 2000.

Application Ser. No. 09/671,503, entitled "NAVIGATION OF HIERARCHICAL QUERY RESULT DATA SPACE USING PROBES AND OPERATIONS", filed on Sep. 27, 2000.

All of the foregoing applications are incorporated herein by reference in their entirety.

BACKGROUND OF THE INVENTION

1. Field of the Invention

This invention relates to managing query results. More particularly, the invention relates to a method, system, computer program product, server, and interface for managing query results.

2. Discussion of Related Work

FIG. 1 shows an example of a computer display 100. The computer display has a status area 110, various program icons 120, an active window 130, a title bar 140 for the active window 130, a toolbar 150 with tool buttons 160, and a window area 200 for the active window 130.

A user interface appearing in the window area 200 may accept inputs from a user relating to query search terms. The query search terms may be provided as an input to an Internet search engine or the like. Typically, the Internet search engine will respond to a query by returning between 0 and several million query results.

FIG. 2 shows an example of how query results are typically presented. The query results appear in the window area 200 of the active window. In the particular example shown in FIG. 2, there is an indicator of the number of hits. The indicator 955 shows that there are 382 results in the query results corresponding to the query search terms provided as a user input. Each query result is provided as a pointer 950. The pointer 950 may be an HTML link. The pointer 950 may also include supplemental information, such as information relating to the content of the Web page indicated by the pointer. There also may be a relevance ranking (not shown). Whether or not the relevance ranking is shown, the relevance ranking is typically used to order the presentation of the query results.

Thus, the conventional approach to managing query result complexity is to determine a relevance ranking for each of the query results, and to order the query results based on the relevance ranking. Where two query results have an identical relevance ranking, it is conventional to present the results in alphabetical order.

The First Related Application

In the first related application "MANAGEMENT OF QUERY RESULT COMPLEXITY USING WEIGHTED CRITERIA FOR HIERARCHICAL DATA STRUCTURING" described above, there is described an improved and novel tool for the collection and ordering of data from heterogeneous sources, including structured and unstructured data.

FIG. 3 shows a set of user interface objects which may be used to obtain user inputs for the improved and novel tool described in this related application. In particular, a plurality of user activatable regions 210 permit a user to enter various categories for a search. In the example shown in FIG. 3, the categories "animal", "usage", and "material" have been entered into the category entry regions 210.

The user activatable regions 220 include slider bars 230 which are used to provide a priority or weighting of the different categories entered into the category entry regions 210. In the example shown in FIG. 3, the further to the right a slider bar 230 is placed, the higher the priority of the corresponding search parameter.

The user activatable regions 240 are value entry regions. These regions are used to provide specific values for searching, each value corresponding to one of the categories. In the example shown in FIG. 3, the categories "ostrich", and "eagle" have been entered in a value entry region 240 that corresponds to the category entry region 210 containing the category "animal".

Together, the information included in the category entry regions 210, the weighting regions 220, and the value entry regions 240 may be referred to as semantic structuring information. In other words, semantic structuring information includes categories, each with a corresponding category weight, each category having corresponding values. The categories are ordered in a category order based on the corresponding category weight. The categories could be ordered on some further basis, of course, but it is sufficient for the present explanation that the categories be ordered on at least the category weight.

Now an explanation will be given of how the semantic structuring information may be used to represent a set of query results as a tree shaped hierarchy, as in the above-identified co-pending application. This is not a conventional approach, but the subject of another patent application. The explanation of producing a tree-shaped hierarchy from semantic structuring information presented here is not as detailed as in the co-pending application, and is not meant in any way to limit the description presented therein.

FIG. 4 shows a set of 16 query results 900–915. Each of the query results 900–915 represents a Web page that is a member of the query results set for the query represented by the semantic structuring information as shown in FIG. 3. In FIG. 4, the information relating to each of the query results is information that may come from the meta tags, the content of the Web page, or the like.

FIG. 5 shows a larger set of query results 900–931 to be discussed shortly.

Figure 6:
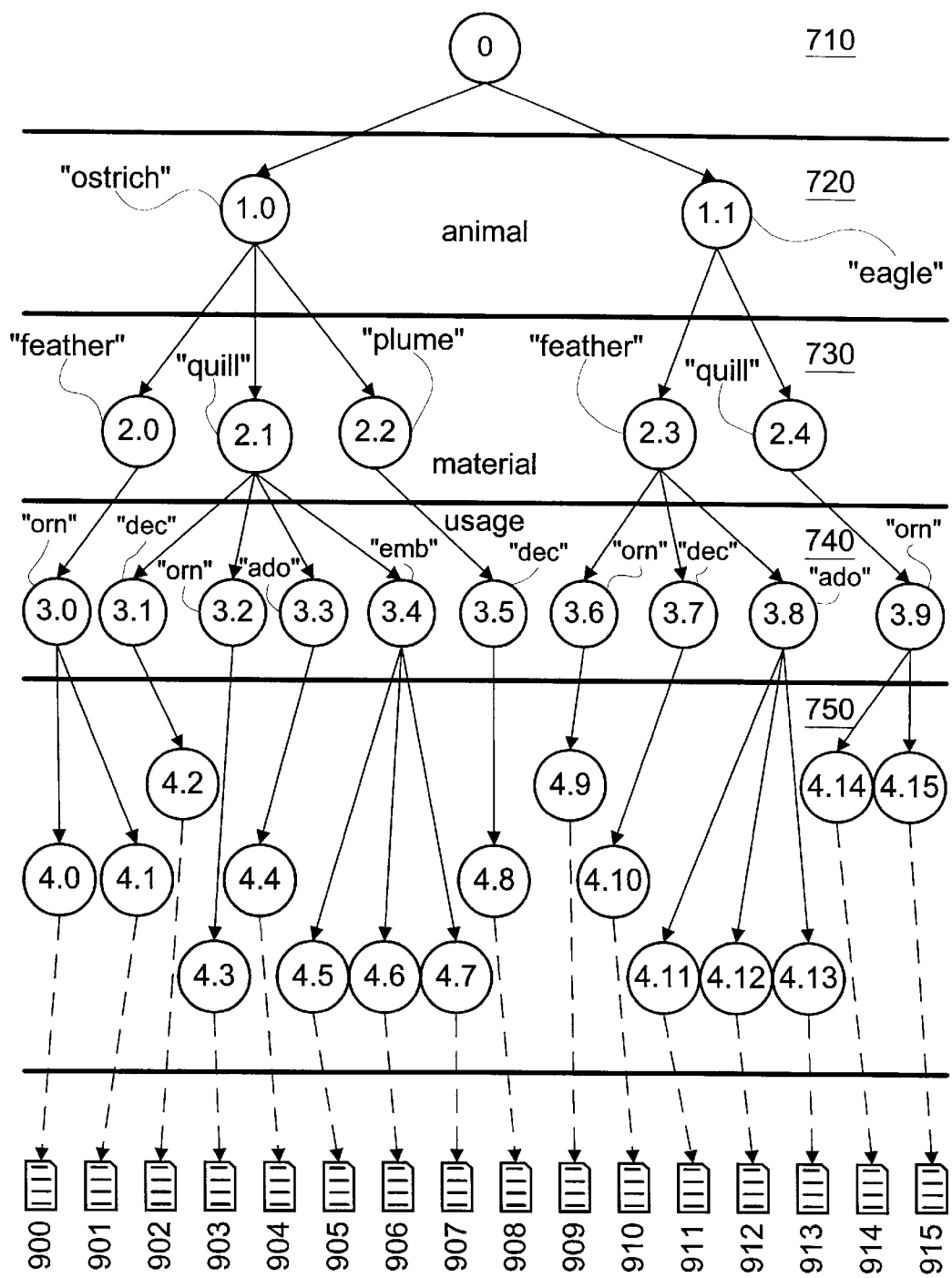
FIG. 6 shows a tree shaped hierarchy that may be built for the query results 900–915 of FIG. 4. Some terminology relating to the tree-shaped hierarchy will now be discussed, as the terminology is relevant also to the discussion of the preferred embodiments of the invention.

In FIG. 6, the tree shaped hierarchy has a root node or control node 0. This root node may be referred to as a query root node QRN. The tree also has intermediate nodes 1.0–3.9. The tree also has leaf nodes 4.0–4.15. The query results 900–915 are not part of the tree, but are merely shown for their correspondence to the leaf nodes 4.0–4.15.

The nodes in this tree-shaped hierarchy are arranged in levels. At the very highest level 710 is the root node 0. The root node 0 represents the query itself. The first level 720 of intermediate nodes has intermediate nodes that are connected directly to the root node 0. That is, intermediate nodes 1.0–1.1 have, as their immediately upward node, the root node 0. It may also be expressed by saying that the first level of intermediate nodes has an immediately upward node (IUN) set of just the query root node QRN.

This first level 720 in the tree-shaped hierarchy of FIG. 6 corresponds to the category having the heaviest weight (in this example, the category "animal"). While the level corresponds to the category, the intermediate nodes in this tree-shaped hierarchy correspond to the particular values that relate to the category. In this example, node 1.0 corresponds to the value "ostrich" of the category "animal"; node 1.1 corresponds to the value "eagle" of the category "animal".

The second level 730 of intermediate nodes corresponds to the category that is second according to the category order (i.e. based on the weighting given the category by the user). The category that is second according to the category order is "material." The second level 730 thus corresponds to the category "material". The intermediate nodes in this level correspond to the values that relate to the category "material": "feather", "plume", and "quill". More particularly, node 2.0 corresponds to the value "feather" and so does node 2.3. Nodes 2.1 and 2.4 correspond to the value "quill". Node 2.2 corresponds to the value "plume".

It will be appreciated that nodes 2.0 and 2.3 differ semantically. In particular, node 2.0 represents any hits that relate to the value "feather" of the category "material" and also to the value "ostrich" of the category "animal". Node 2.3 represents any hits that relate to the value "feather" of the category "material" and also to the value "eagle" of the category "animal". Likewise, the relevance of node 2.1 is to those hits relating to "quill" and "ostrich", while the relevance of node 2.4 is to those hits relating to "quill" and also "eagle".

The absence of a node relating to the value "plume" for the category "material" connected to node 1.1 indicates that no hits were identified that relate to "plume" and also "eagle".

The nodes 2.0–2.4 of the second level 730 of intermediate nodes all have, as an immediately upward node IUN, one of the nodes of the first level 720 of intermediate nodes. In other words, nodes 2.0–2.2 have, as their IUN, node 1.0; nodes 2.3–2.4 have, as their IUN, node 1.1. More generally, the IUN set for the second level 730 is all of the nodes of the first level 720.

The nodes 3.0–3.9 of the third level 740 of intermediate nodes, in like manner, all relate to one of the values ("decoration", "ornament", "adornment", or "embellishment") of the next category in in the category order (i.e., the category "usage"). In FIG. 5, "ornament" is abbreviated as "orn"; "decoration" is abbreviated as "dec"; "adornment" is abbreviated as "ado"; and "embellishment" is abbreviated as "emb".

The nodes 4.0–4.15 are all leaf nodes, and each leaf node corresponds to one of the query results 900–915. Each of the nodes 4.0–4.15 has, as its IUN, one of the nodes of the third level 730 of intermediate nodes. To put it another way, the IUN set for the leaf nodes is the set of nodes in the third level 730.

It will be appreciated that the query results 900–915 have information (i.e., meta-tags or the like) that relates to the values requested by the user for each of the categories. For example, as shown in FIG. 4, result 900 relates to "ostrich", "feather", and "ornament". The leaf node 4.0 that points to query result 900 may thus be said to be attributed with this same information. Inasmuch as the value "ostrich" relates to the category "animal", the leaf node 4.0 may be said to have a category-value of "ostrich". The leaf node 4.0 thus is attributed with (in this example) three category-values, each of which corresponds to one of the categories. The query results 900–915 may have additional meta-information (not shown) as well, although this additional meta-information may be irrelevant to the semantic structuring information provided by the user.

Clearly, node 4.0 is attached in its particular location because it relates to usage=ornament and material=feather and animal=ostrich. This is evident by tracing an upward path of nodes (UPN) through nodes 3.0, 2.0, and 1.0 to the root node 0. The UPN of any node defines, semantically, the relation of the node to the overall query. Another way to put this is to say that, in the tree-shaped hierarchy, it is a requirement that the category-values of a leaf node satisfy an uptree relation. Here, "uptree relation" is defined as a relation satisfied when the category-values of a leaf node include at least the values represented by each of the nodes in the path upward to the root node). Thus, the leaf nodes are attached based on an uptree relation.

Yet another way to express this concept of the uptree relation is to describe it in the sense of an upward value set UVS. The UPN of a leaf node passes through nodes that each have a respective node value. The collection of the respective node values for the nodes in the UPN thus may be said to define an upward value set UVS. A leaf node must be attached in the tree-shaped hierarchy so that the values represented in its content include values considered equivalent to at least all of the values in the UVS.

A tree-shaped hierarchy such as that shown in FIG. 6 may be thought of as defining a virtual space. For every given node, the set of nodes consisting of the given node itself, and also the nodes immediately downward of the given node may be thought of as defining a space cube. For example, node 2.1 and nodes 3.1, 3.2, 3.3, and 3.4 define a space cube. Likewise, node 1.0 and nodes 2.0, 2.1, and 2.2 define another space cube. In a space cube, the highest node is the space cube root node and the other nodes in the space cube are space cube leaf nodes. In the space cube having nodes 2.1, 3.1, 3.2, 3.3, and 3.4, e.g., node 2.1 is the space cube root node and nodes 3.1, 3.2, 3.3, and 3.4 are the space cube leaf nodes.

A space cube, although it does not contain nodes above the space cube root node, includes a link to at least the IUN of the space cube root node.

The tree-shaped hierarchy such as that shown in FIG. 6 can advantageously be used, as explained in the above-identified co-pending application, to simplify the navigation of the user through the set of query results. That is, the user can start out being presented with a choice of looking at hits relating to "ostrich" or to "eagle". If the user elects to investigate hits relating to "ostrich" (i.e., node 1.0), he can be presented with the choice of exploring hits relating not just to "ostrich", but also to "feather" (node 2.0), "quill" (node 2.1), or "plume" (node 2.2). As can easily be seen, the user can be presented with query results in a semantically structured hierarchy, based on the user's own category and value information.

Figure 2:
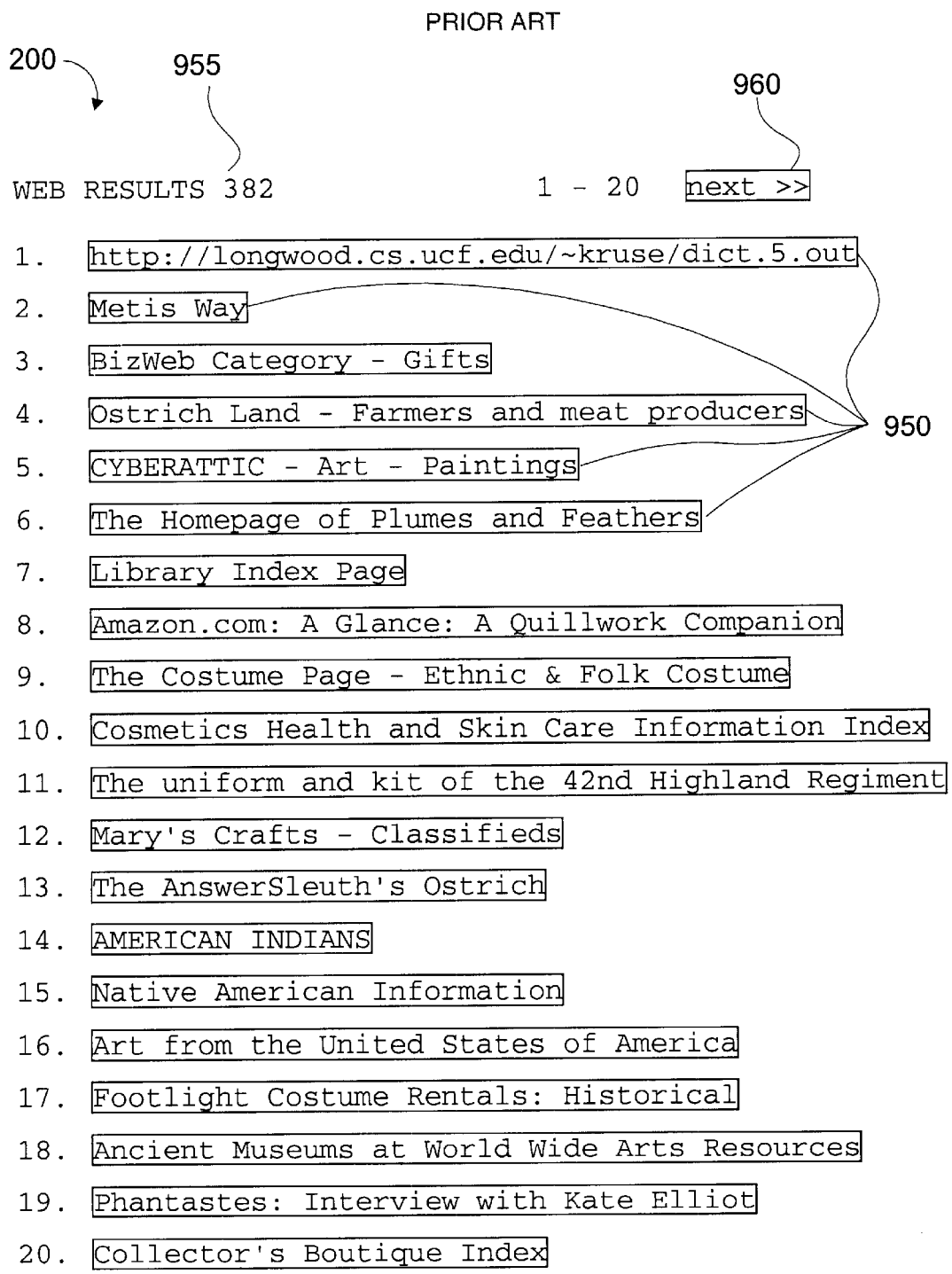

The intermediate nodes of a tree-shaped hierarchy are based on semantic structuring information and form a semantic structure that gives some depth and greater dimension to the otherwise flat conventional presentation of query results exemplified in FIG. 2.

Although a tree-shaped hierarchy such as that shown in FIG. 6 is highly advantageous, there are situations in which more help in managing query results is required. For example, when a query returns thousands or millions of query results, even though the tree-shaped hierarchy helps a user simplify the results to a great extent, the leaf nodes at the lowest level still may have numerous leaf nodes attached to each immediately upward node.

Figure 7:
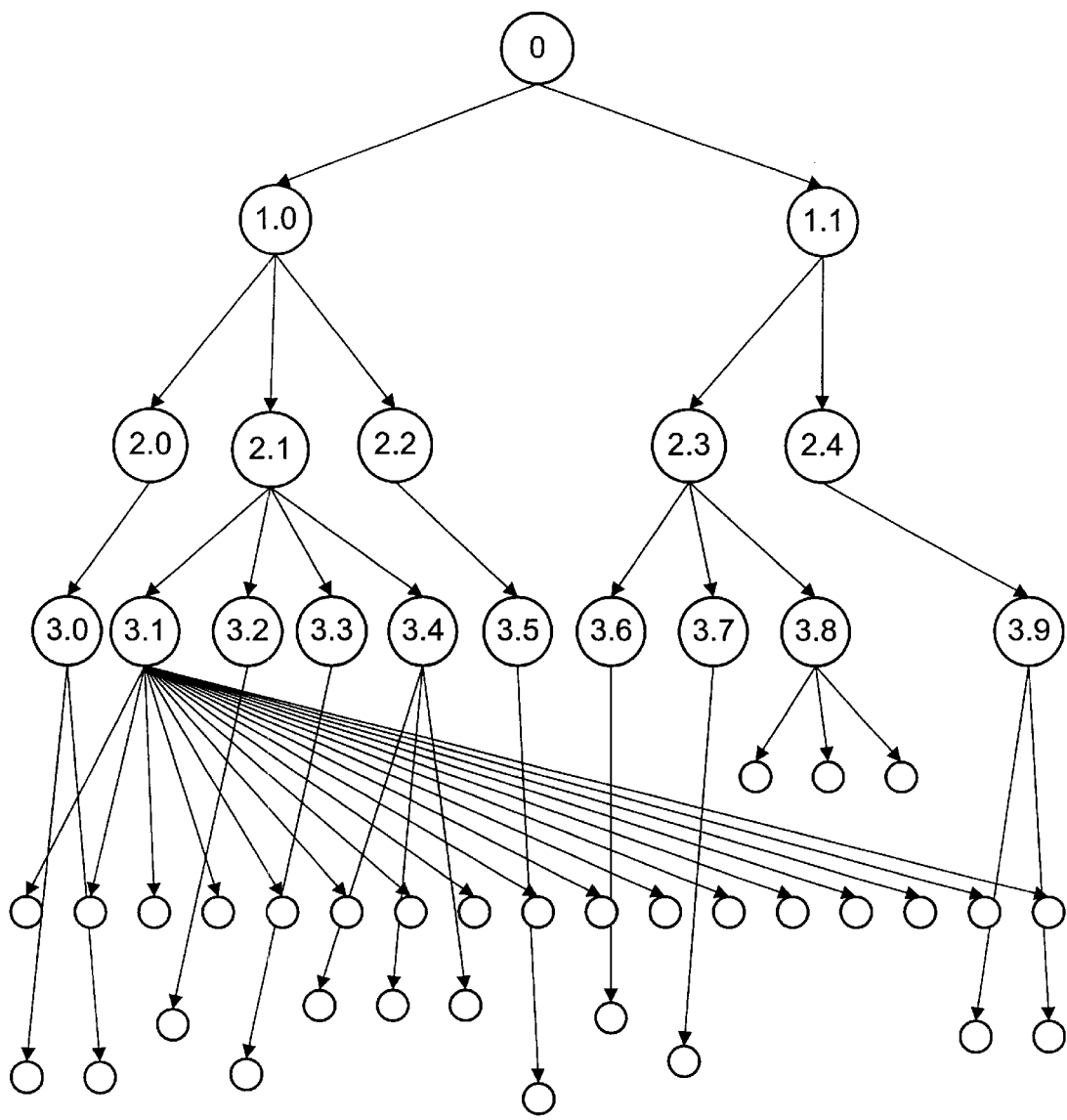

The query results shown in FIG. 5 illustrate this problem. If this set of query results was structured into the tree-shaped hierarchy, the results might be as shown in FIG. 7. In FIG. 7, node 3.1 relates to ostrich, quill, and decoration. The results shown in FIG. 5 include 17 results that relate to ostrich, quill, and decoration. A user navigating through the virtual space to node 3.1 would be presented with 17 results all at once. Even though the situation is far better than that shown in FIG. 2, it still represents quite a bit of information for a user to handle.

In queries with hundreds, thousands, or millions of hits, some additional structuring is necessary. This additional structuring, however, has heretofore been unavailable.

SUMMARY OF THE INVENTION

To provide additional structuring and thus overcome the foregoing problems, there is herein described a method for managing query result complexity. The management of query results includes receiving query results and semantic structuring information, and defining a root node corresponding to the query to which the results relate. The management further includes creating a semantically structured tree descending from root node so as to have intermediate nodes generally in layers. The intermediate nodes are arranged in the layers according to the semantic structuring information. The tree has, at a lowest level of each branch, leaf nodes, each of which corresponds to a query result. The leaf nodes are attached to the tree based on an uptree relation. An important aspect of the solution is that the tree has a space cube structure balanced on the basis of a semantic threshold.

BRIEF DESCRIPTION OF THE DRAWING FIGURES

Figure 1:
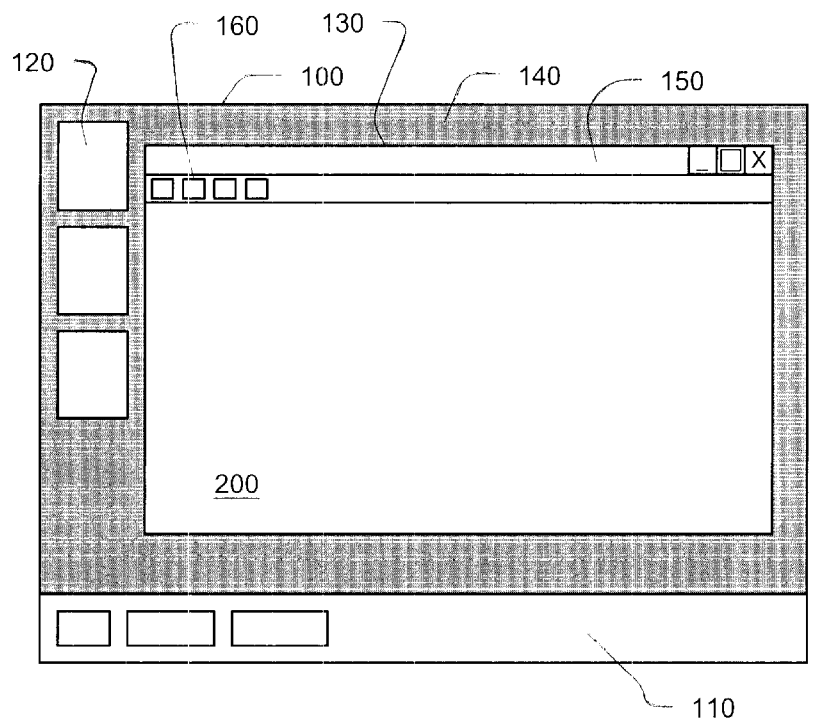

FIG. 1 shows a typical windowing user interface.

FIG. 2 shows a conventional display of query results.

FIG. 3 shows a user interface used for obtaining semantic structuring information.

FIG. 4 shows a sample set of query results returned based on the semantic structuring information shown in FIG. 3.

FIG. 5 shows another sample set of query results, more numerous than the query results shown in FIG. 4.

FIG. 6 shows a semantically structured tree shaped hierarchy created from the query results shown in FIG. 4.

FIG. 7 shows a semantically structured tree shaped hierarchy created from the query results shown in FIG. 5.

Figure 8:
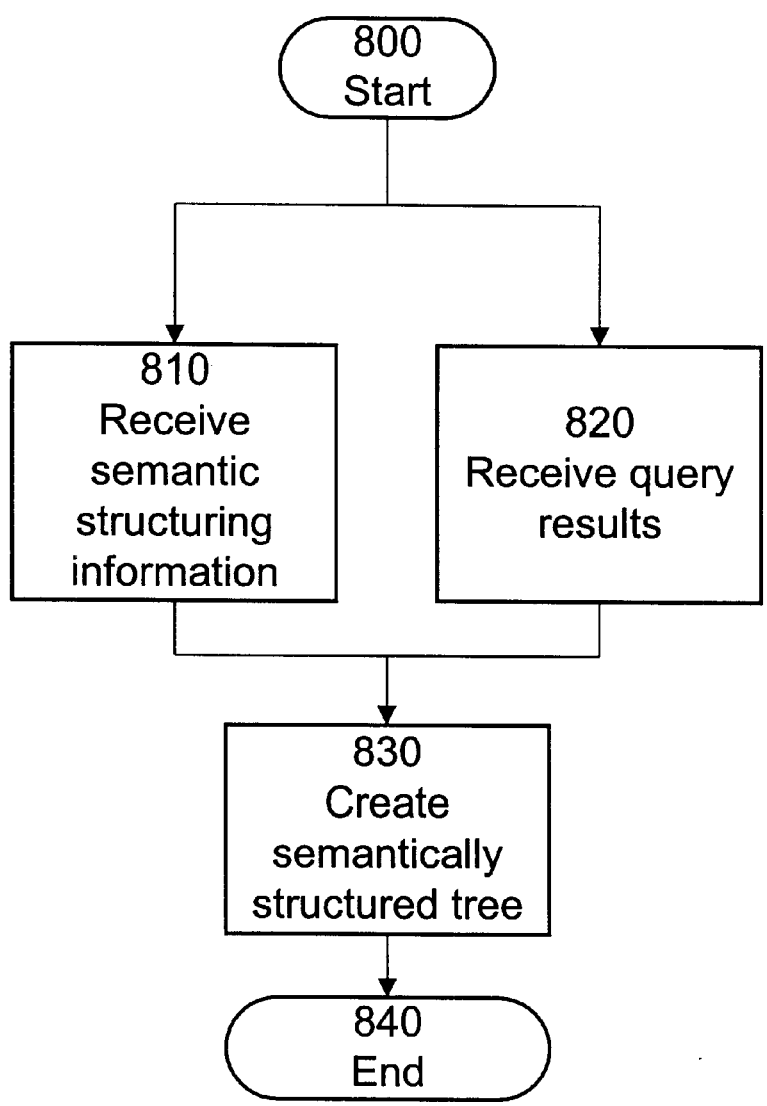

FIG. 8 shows a flow diagram indicating the operation of one of the preferred embodiments of the invention.

Figure 9:
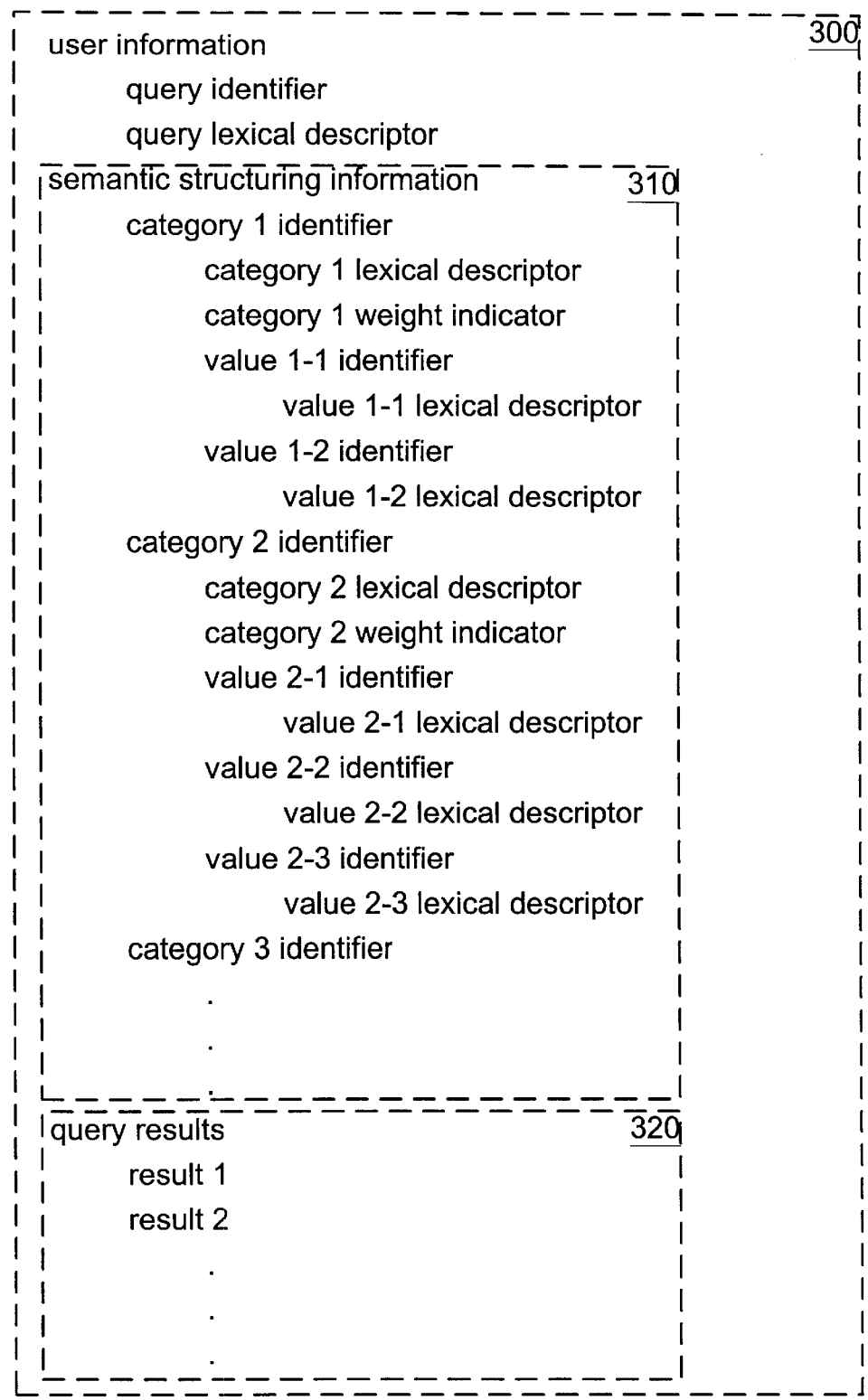

FIG. 9 illustrates structuring information.

Figure 10:
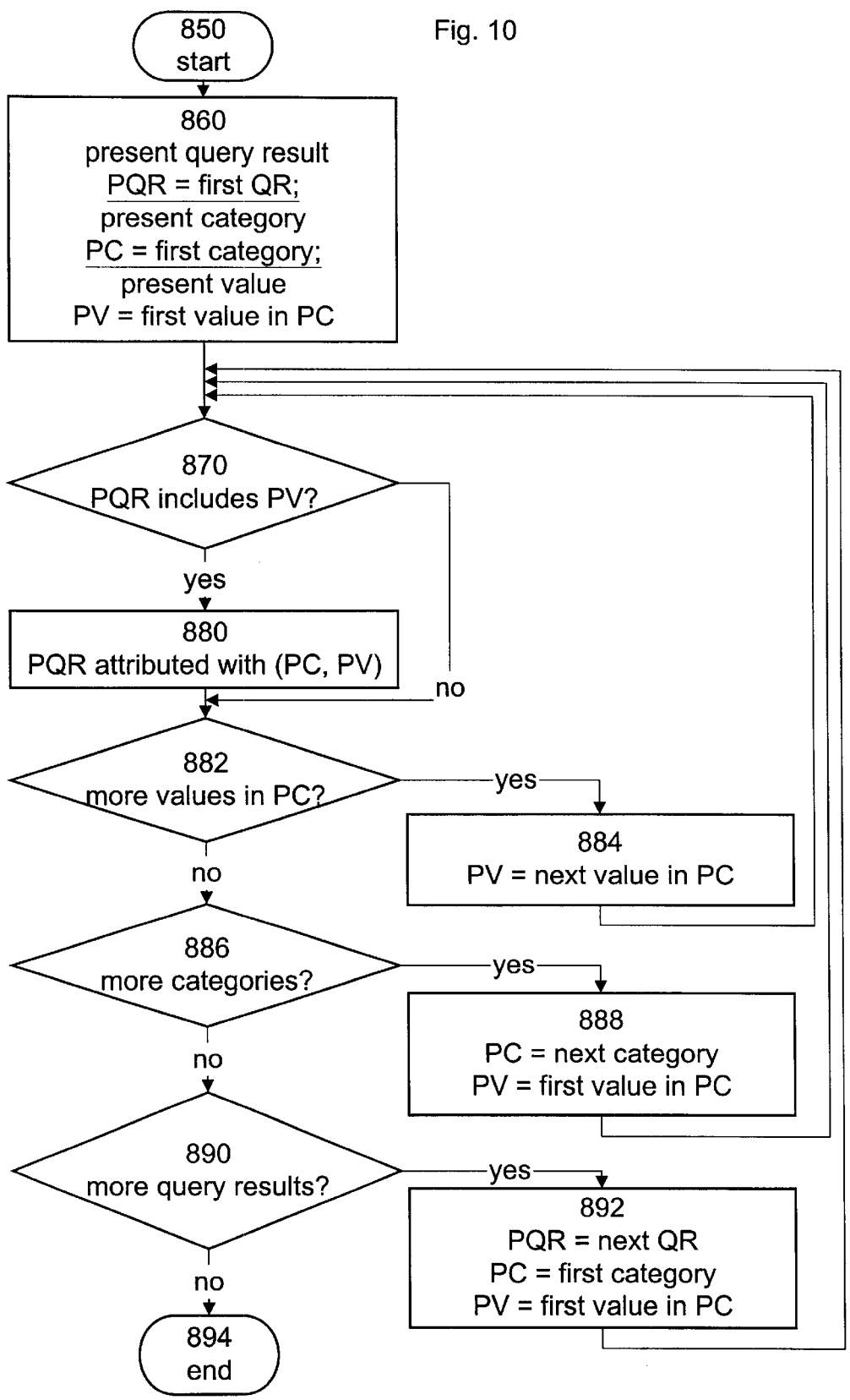

FIG. 10 includes a flow diagram describing an operation for processing query results.

Figure 11:
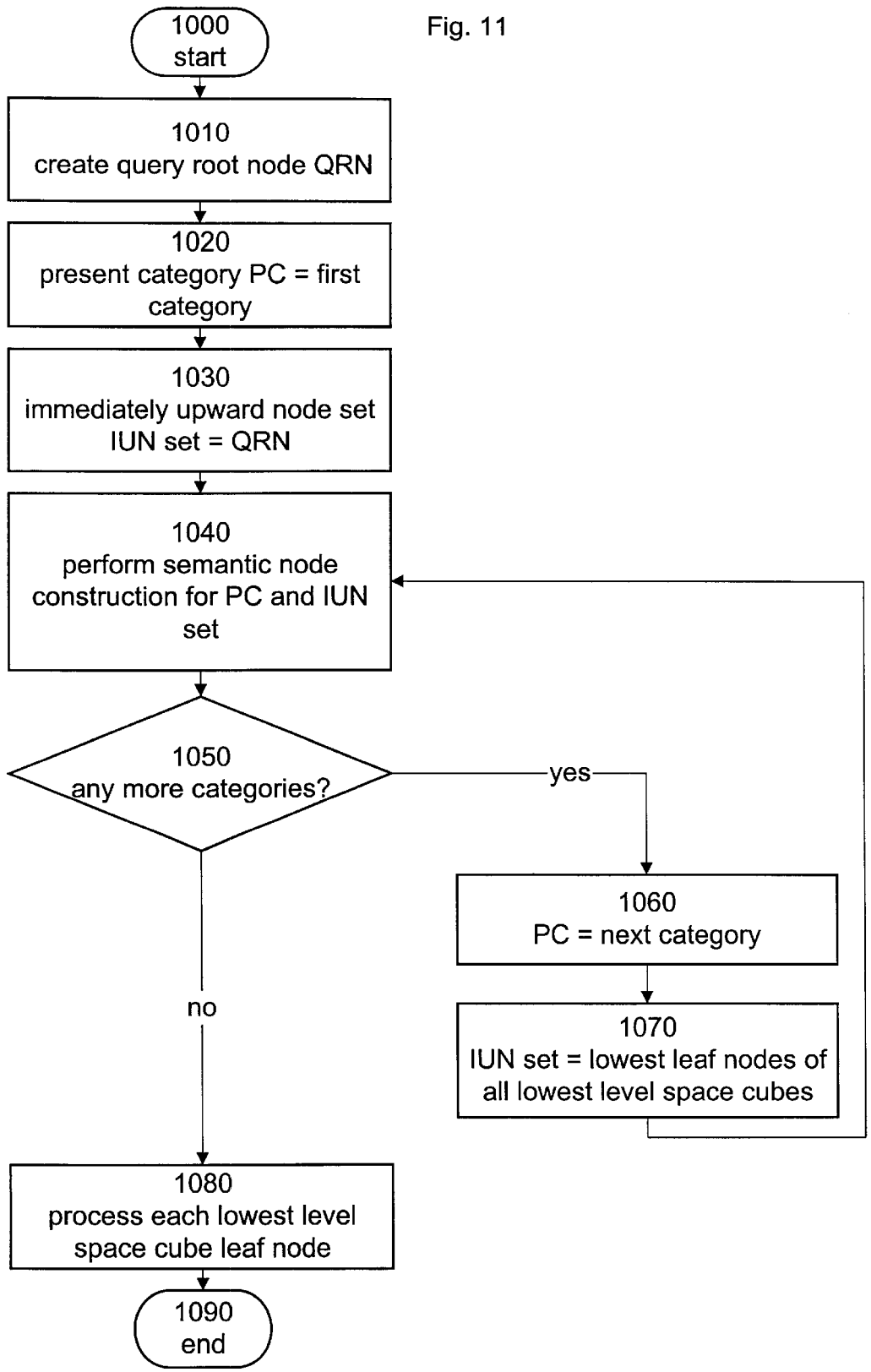

FIG. 11 includes a flow diagram describing an operation for semantically structuring query results.

Figure 12:
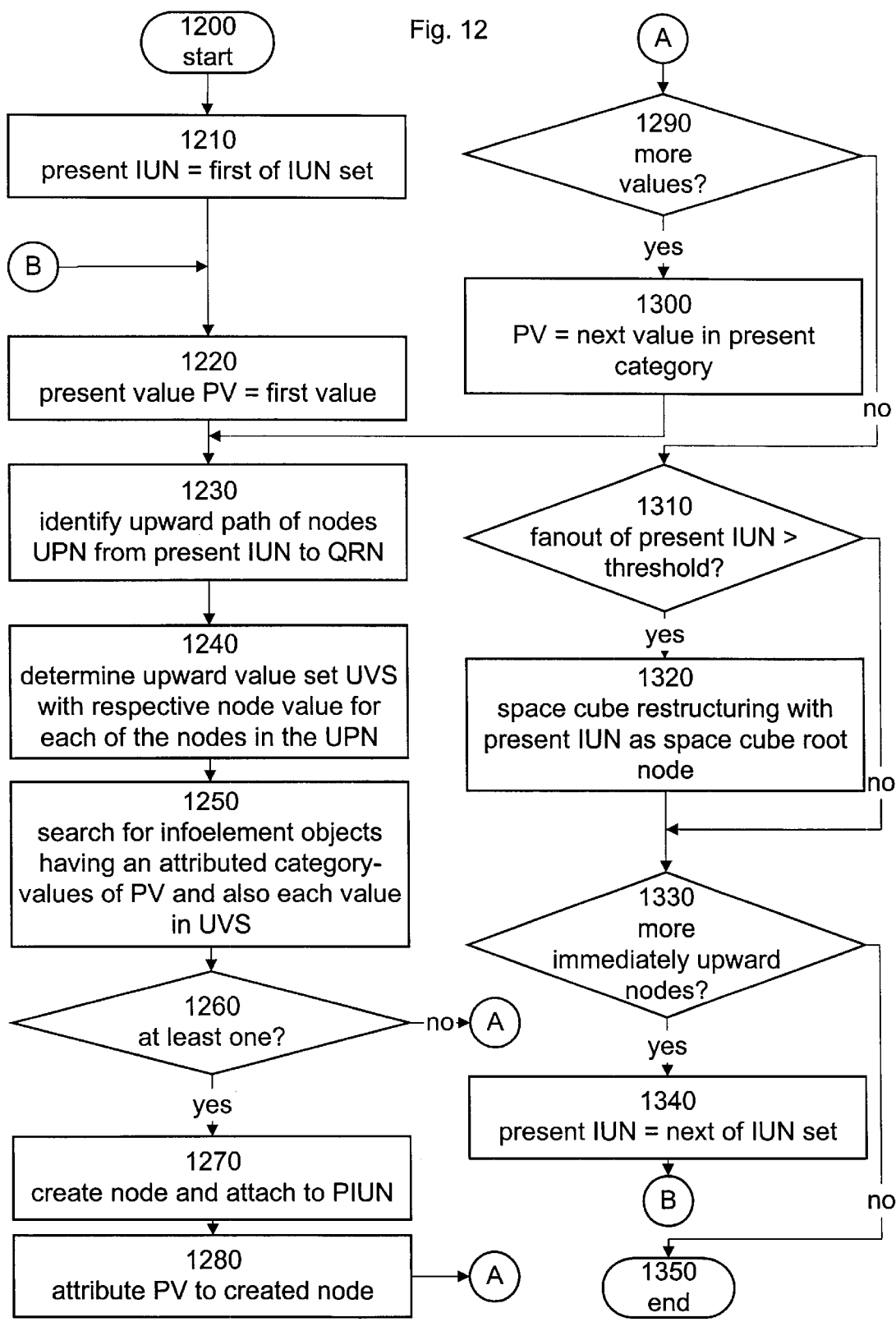

FIG. 12 includes a flow diagram describing an operation for semantic node construction.

Figure 13:
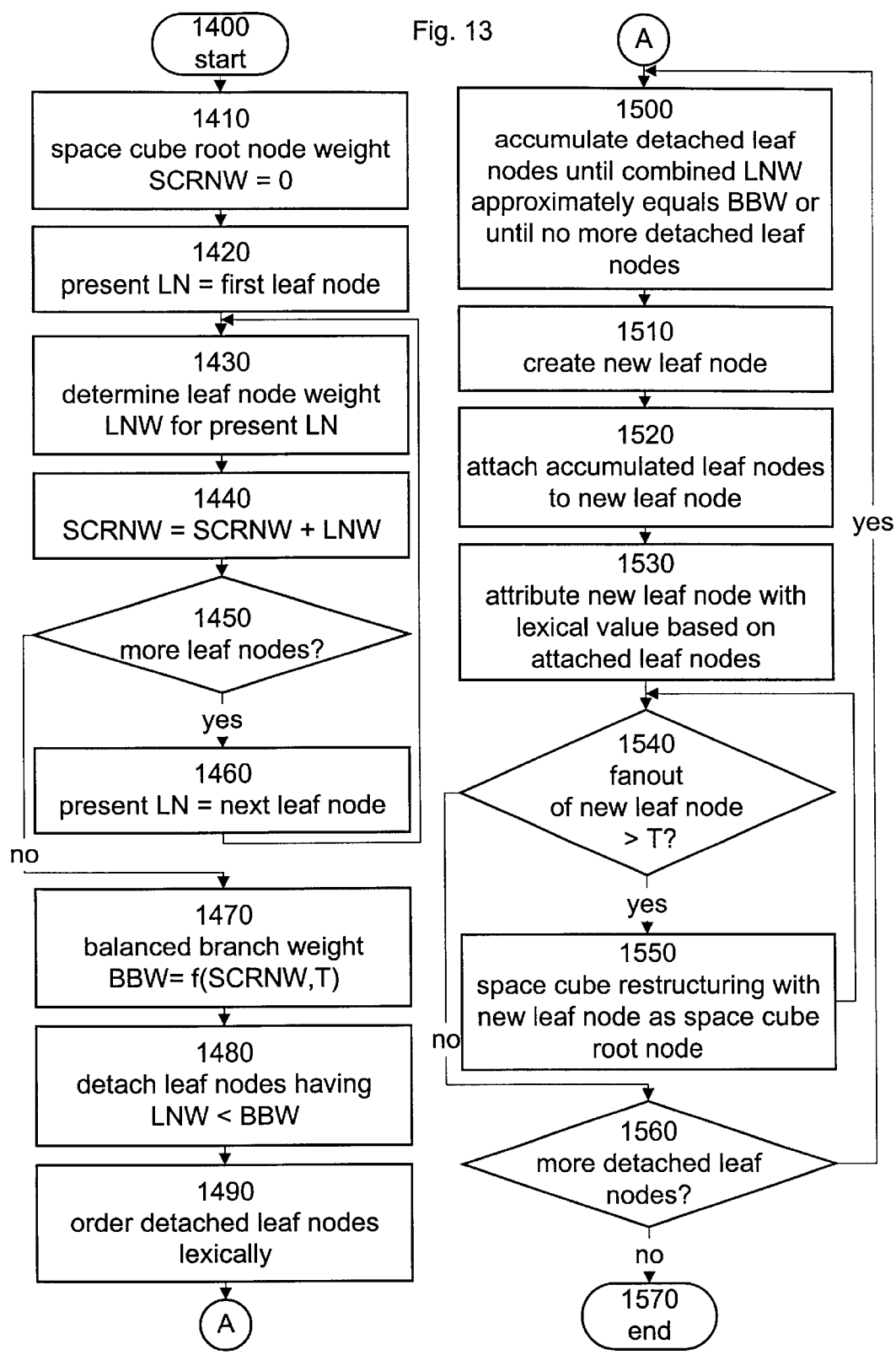

FIG. 13 includes a flow diagram describing an operation for space cube restructuring.

Figure 14:
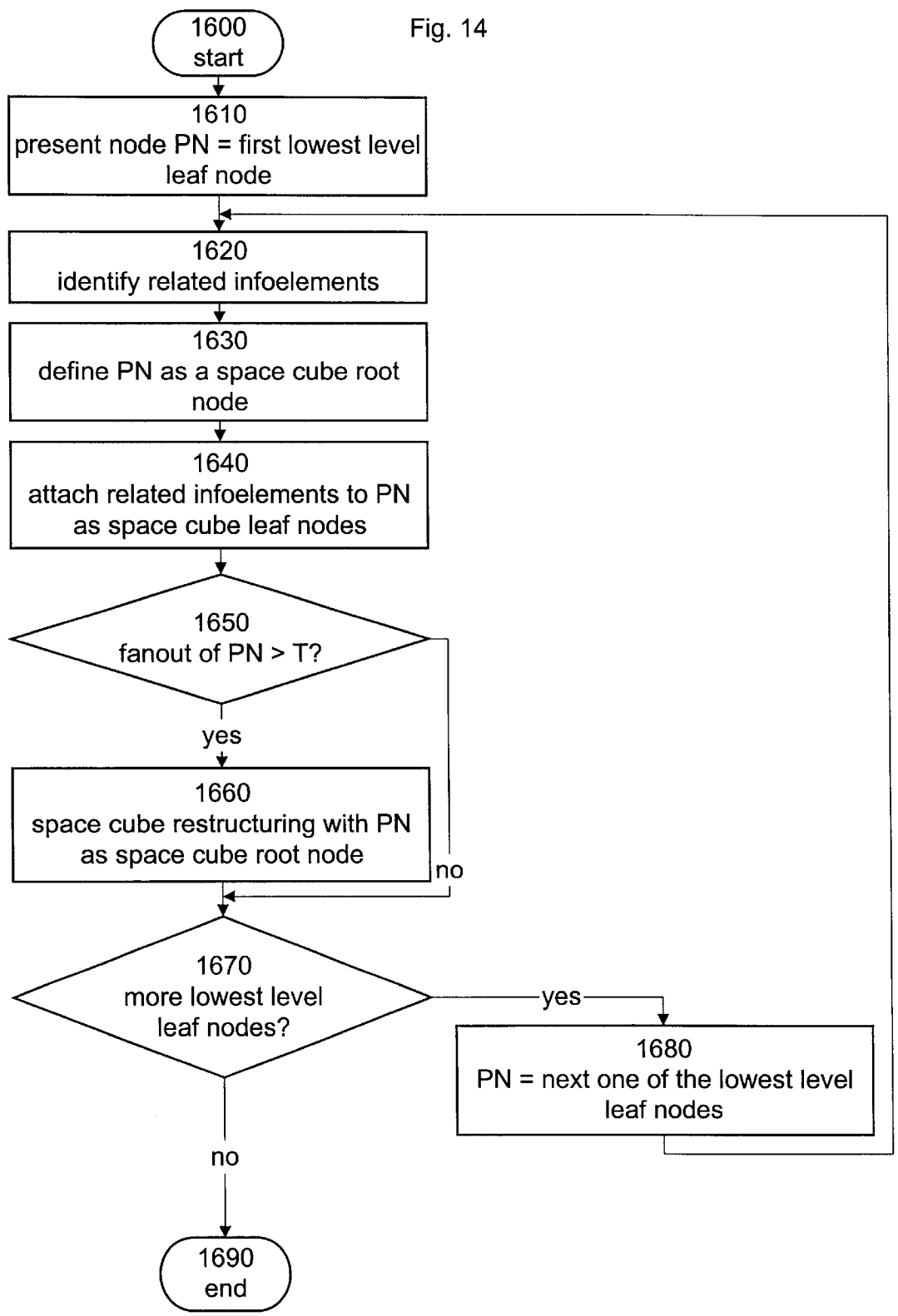

FIG. 14 includes a flow diagram describing an operation for processing the lowest level of intermediate nodes as lowest level leaf nodes.

Figure 15:
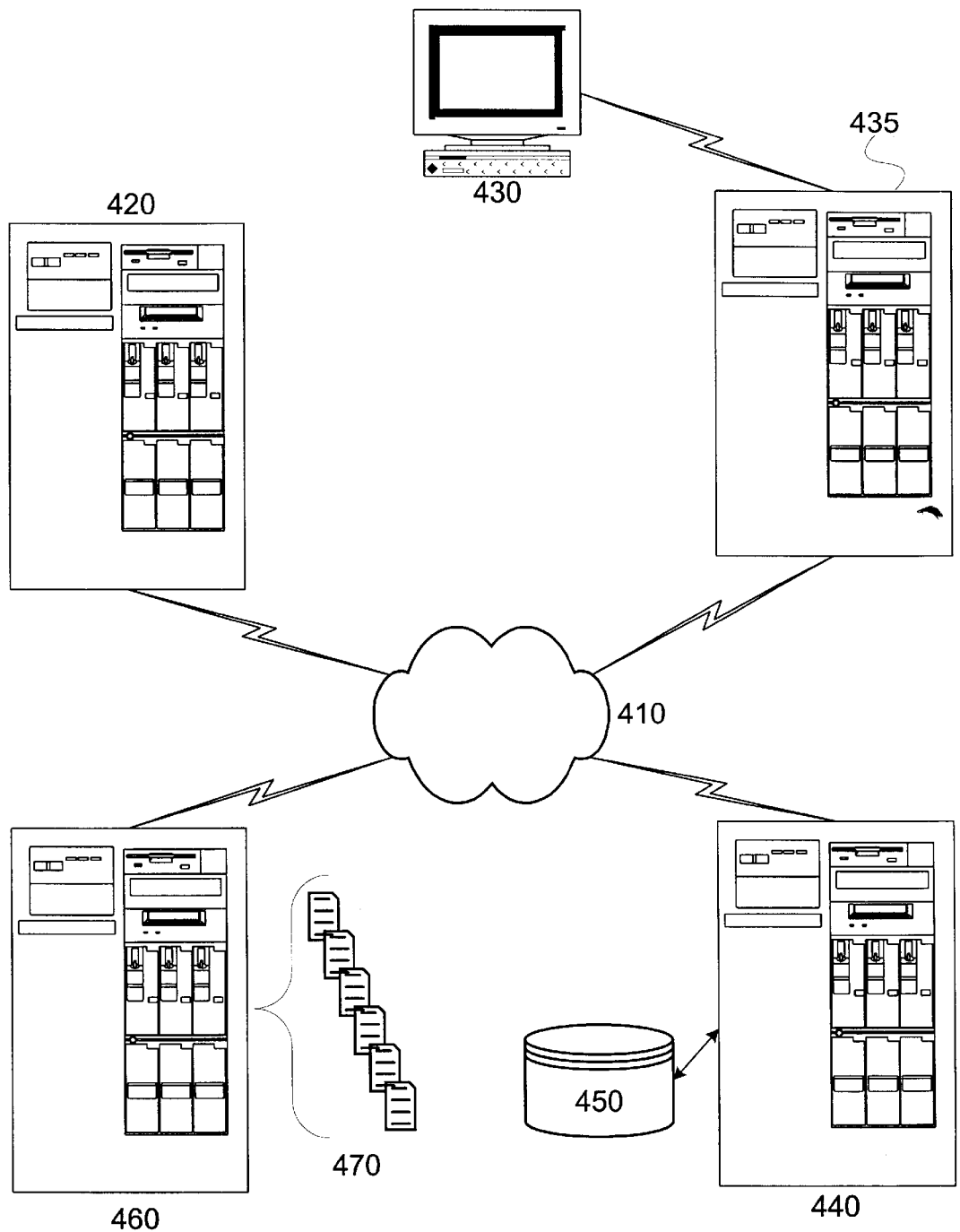

FIG. 15 shows a highly simplified schematic diagram of how the structuring information might be passed among different network components on a worldwide network such as the Internet.

Figure 16:
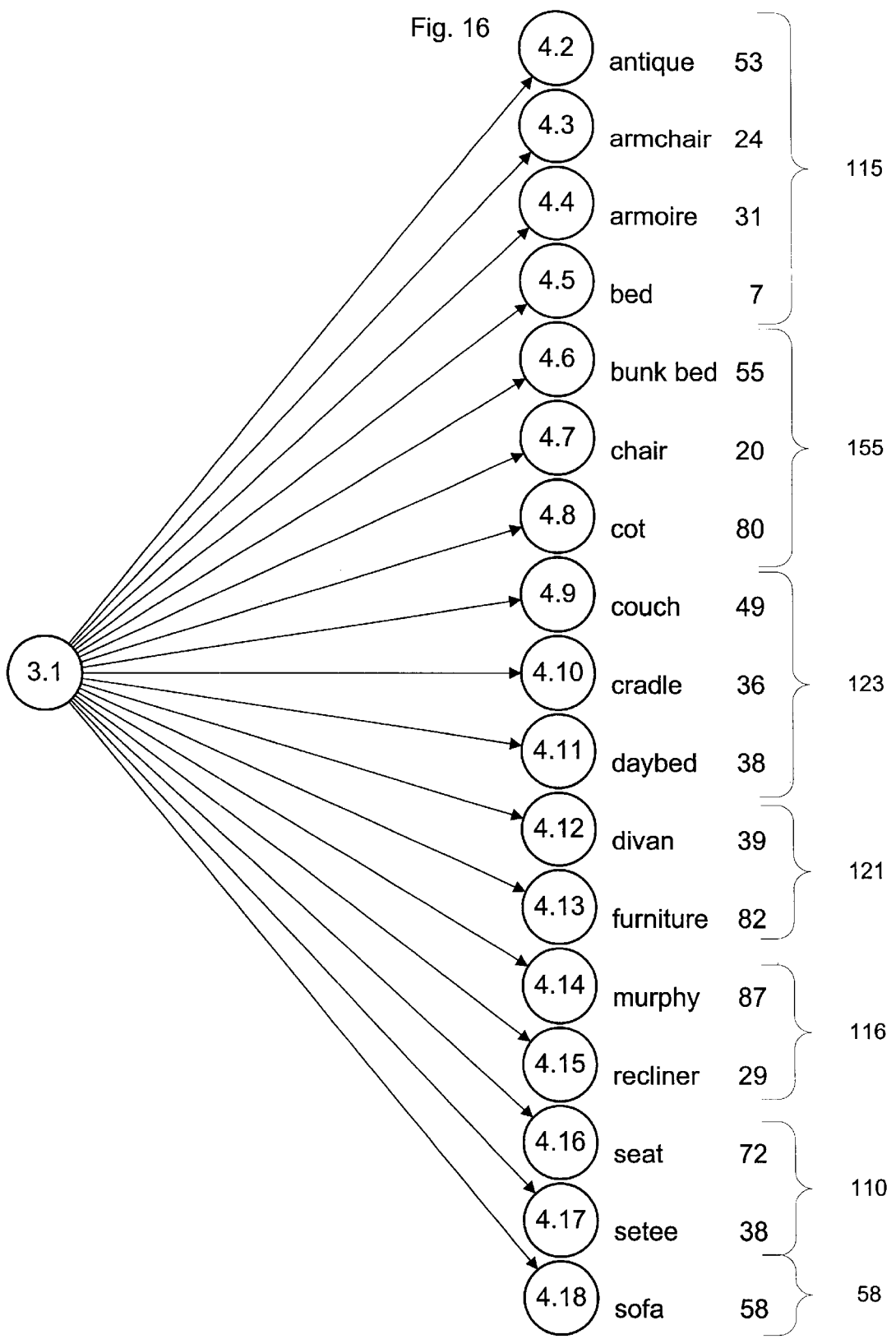

FIG. 16 shows a part of a hierarchy used to explain the concept of space cube restructuring.

Figure 17:
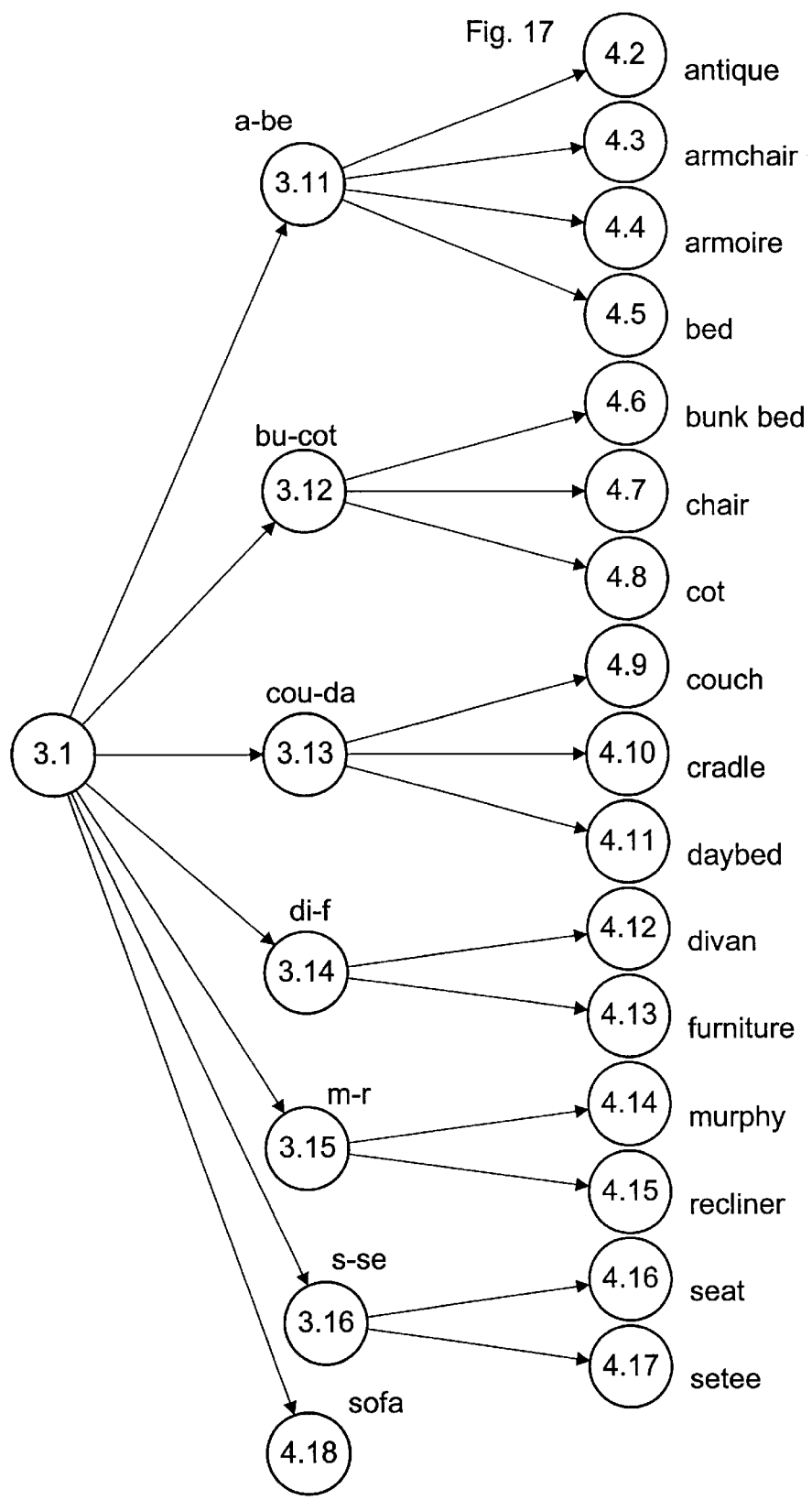

FIG. 17 shows a part of a hierarchy used to explain the concept of space cube restructuring using lexical values.

Figure 18:
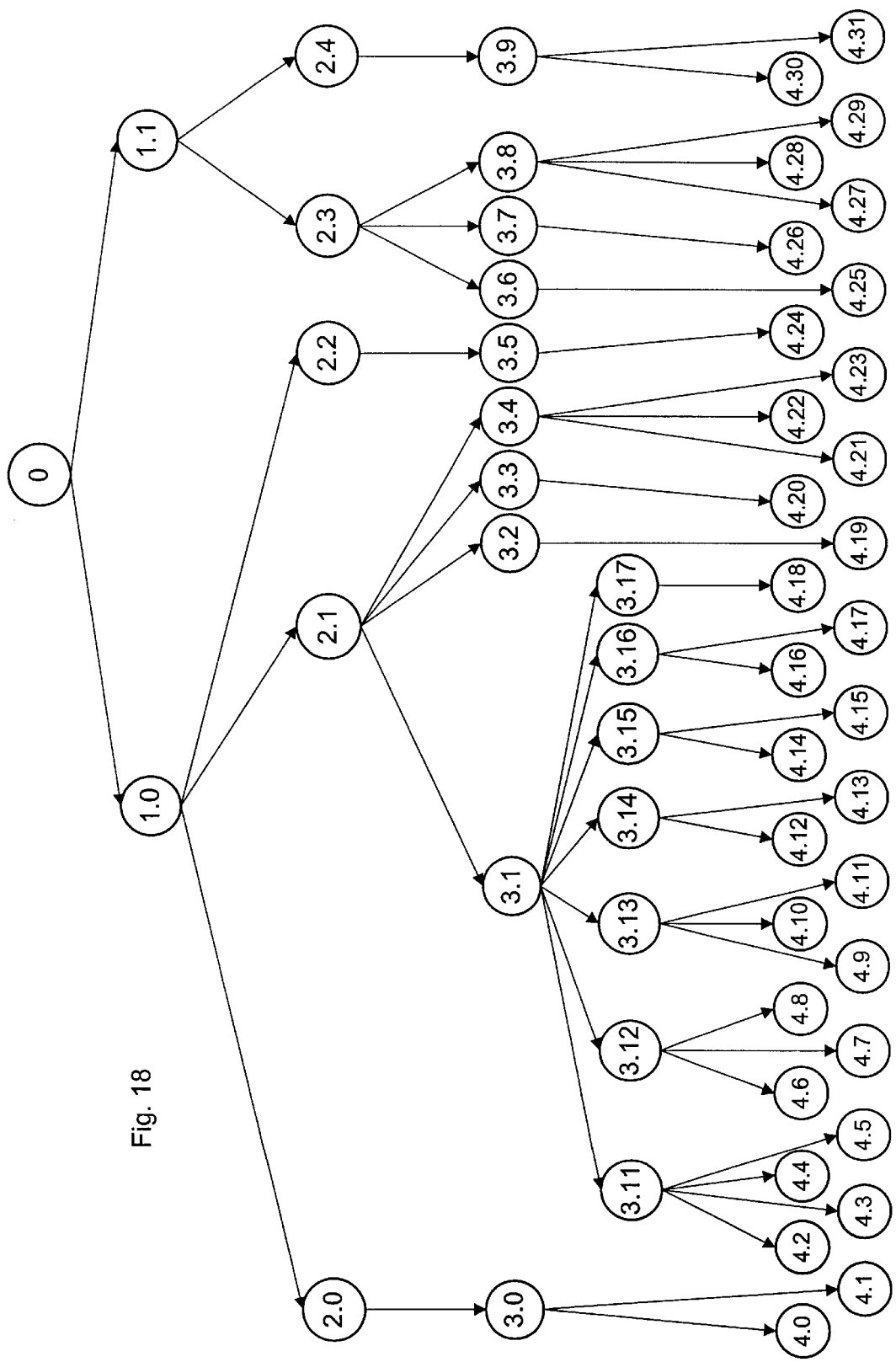

FIG. 18 shows a semantically structured tree-shaped hierarchy balanced on the based of a predetermined semantic threshold.

FIG. 19 shows data structures that may be used to send information pertaining to parts of the tree-shaped hierarchy of FIG. 18.

DETAILED DESCRIPTION OF THE PREFERRED EMBODIMENTS

A presently preferred embodiment of the invention provides for handling information in accordance with a semantic threshold.

Hardwired in the human brain is the principle how complexity is handled. If any set of things that must be handled together at one moment in time is larger than the semantic threshold of the human (9 is the median semantic threshold; the individual number depends on IQ), the human tends to "chunk" or "structure" the data in smaller parts. When appropriate structuring (i.e., "chunking") cannot be done, the human viewer loses overview and gets confused. This principle has been time tested and is embodied in many fields, such as in rhetorics (i.e., sentences with up to 9 subjects/objects are considered easier to comprehend than those with more), architecture, and in computer science.

The present embodiments of the invention attempt to make human comprehension of query results more manageable by employing the principle of the semantic threshold to the structuring of query results. In accordance with the semantic threshold, the preferred embodiments structure query results and semantic information in a manner that supports the presentation of data in manageable chunks.

A detailed description of the operation of a presently preferred embodiment of the invention will now be given. It will be understood that there are various ways of implementing the invention, and that the present example is for the sake of explanation only. The many specificities and details included in the description of this example are not intended to limit the invention to only this precise example.

FIG. 8 shows a flow diagram that illustrates the overall concept of the invention. In step 800, the process begins. In step 810, semantic structuring information is received. In step 820, query results are received. The form in which the semantic structuring information and the query results are received may be as shown in FIG. 9.

In FIG. 9, reference numeral 300 indicates a data file or a data transmission that includes user information, a query identifier, and a query lexical descriptor. The user information might be used to distinguish the data between different users. The query identifier may be a number or other control information used to identify or to bill the query. The query lexical descriptor may be a string such as "my query" used to help the user identify the query and to differentiate it from other queries made by that same user.

Numeral 310 indicates semantic structuring information. Semantic structuring information may include categories, category weights, and values as already explained above. The semantic structuring information 310 includes, for example, a category identifier for each category. The category identifier may be a numeric or other similar field used by a computer system to uniquely identify the category. The category identifier may be a string such as "animal". The category weight indicator may be, for example, a number from 1 to 100 or any other way of indicating the category order of a given category. Likewise, this field can be omitted entirely and the category weight can be implied by the position of the category within the semantic structuring information. The value identifier may be a numeric or other similar field used by a computer system to uniquely identify a value of a category. The value identifier may be a string such as "ostrich".

Numeral 320 indicates the query results such as those shown in FIG. 4 and in FIG. 5. The query results include locator information such as a URL, content information such as meta-tags and keywords, and other possible information.

Returning now to FIG. 8, step 830 includes creating a semantically structured tree. The semantically structured tree according to this invention is not identical to that mentioned in the above-identified co-pending application, but much of the terminology already explained above is applicable here and will be used.

As part of creating a semantically structured tree, it is necessary to process the query results. Each of the query results needs to be analyzed to determine how it will fit into the semantically structured tree. In the presently preferred embodiment, an infoelement object is created for each query result. Of course, the object-oriented methodology-is not necessarily required. A database not using objects could be used, and also any other manner of handling a potentially large set of data.

The infoelement object representing a given query result is attributed with information relating to the categories and values to which it pertains, and also is attributed with information that represents a relevance score, and may additionally have information such as keywords, meta-tags, or the like.

FIG. 10 relates to the processing of query results and the attribution of category and value information to a given query result. The process illustrated by FIG. 10 begins with step 850. In step 860 the first of the query results (QR) is selected as the present query result (PQR) being processed. The first category is selected as the present category (PC) and the first value of that category is selected as the present value (PV) being processed. In step 870, a determination is made as to whether the present query result includes, in its information, a value considered to be equivalent to the present value.

For example, let it be assumed that the semantic structuring information is as shown in FIG. 3, and that the set of query results is as shown in FIG. 5. In step 860, the PQR is set to query result 900; the PC is set to "animal"; and the PV is set to "ostrich". In step 870, it is determined whether the query result 900 includes information relating to "ostrich". Of course, an exact match is not necessarily required in situations in which a wild-card term is used as a value. Here, query result 900 does contain information relating to "ostrich", and therefore processing continues to step 880. If the determination at step 870 had not been affirmative, processing would have continued instead with step 882.

In step 880, the infoelement object representing the PQR (i.e., query result 900) is attributed with the category "animal" and also the value "ostrich". Thus, even though query result 900 might not include information equivalent to "animal", the infoelement object that represents query result 900 is attributed with the category "animal". To put it another way, the infoelement object for the query result 900 is given a corresponding category-value of "ostrich" corresponding to the category "animal". This information may be stored in the infoelement object in any manner, such as (animal/ostrich).

In step 882, it is determined whether there are more values in the present category. In the instant example, there is another value (i.e., "eagle") in the present category "animal". Since this determination is in the affirmative, the path indicated by "yes" is followed and processing continues with step 884. If the determination had been negative, the path indicated by "no" would have been followed to step 886.

At step 884, the next value in the present category is set as the present value and processing continues back with step 870. At this point, the question at step 870 would have been whether the PQR includes a value relating to "eagle". It is quite possible for a given query result to include values that relate to multiple categories and multiple values within categories. Query result 900 does not relate to "eagle" and therefore processing continues directly to step 882 without the execution of step 880.

The determination in step 882 as to whether there are more values in the present category is in the negative because both values in the category "animal" (i.e., ostrich and eagle) have been processed. Therefore, processing continues with step 886 at which step a determination is made as to whether more categories need to be processed with respect to the PQR. Here, there are more categories (i.e., "usage" and "material") that need to be processed and so the determination is in the affirmative and processing follows the line marked "yes" to step 888.

In step 888, the next category for processing is set as the present category PC. It is not strictly necessary at this point to take the categories in the category order according to weight. For the sake of simplicity, however, it will be assumed that the categories will be taken in the category order based on weight. Therefore, PC is a set to the category "material". Also, PV is set to the first value in the PC (i.e., PV is set to "feather" as the first value in the category "material"). Processing then passes from step 888 to step 870.

Thus, in step 870, the determination being made relates to whether the query result 900 contains information equivalent to "feather". Since it does, query result 900 will be attributed with (material/feather) or the like.

When query result 900 has been processed with respect to all of the values in all of the categories contained in the semantic structuring information, processing will eventually arrive at step 890. In step 890, a determination is made as to whether more query results remain to be processed. In the present case, query results 901–931 have not been processed and therefore processing will follow the line marked "yes" to step 892 in which the next query result 901 is set as the PQR. In addition, the first category is set as the PC and the first value of the first category is set as the PV.

In like manner, each of the query results is processed until, in step 890, it is determined that there are no more query results to process. Processing follows the line marked "no" to step 894. Step 894 indicates the end of the processing of query results.

As a result of the process shown in FIG. 10, or any process like it, a collection of infoelement objects is built. Each of the infoelement objects is based on the content of a query result. Each is attributed with category-value information corresponding to the categories, with additional information such as meta tags or keywords associated with the query result, and with a respective weight that may indicate the potential relevance of the query result to the query.

The weight attributed to the infoelement object may be referred to as an infoelement object weight, and may be determined in a variety of ways. There are many conventional ways of calculating a relevance score for a given hit. It suffices to say that the infoelement object weight is determined based on at least the meta-information (i.e., the meta tags, keywords, and/or content) associated with the particular query result.

FIG. 11 describes a process for semantically structuring the query results in a tree shaped hierarchy. It will be appreciated that it is not absolutely necessary that the steps shown in FIG. 10 take place before the steps shown in FIG. 11, but it will also be appreciated that this is a potentially more efficient sequence to follow.

In FIG. 11, processing begins with step 1000. In step 1010, a query root node QRN is created. The QRN represents the query. The QRN may be implemented as an object.

After the creation of the QRN, in step 1020, the present category PC is set to be the first category according to the category order (i.e., based on category weight). In step 1030, an immediately upward node set (IUN set) is defined. The IUN set in step 1030 is defined as a set containing only the QRN.

In step 1040, semantic node construction is performed for the present category PC and the immediately upward node IUN set. Semantic node construction is depicted in FIG. 12, and will be explained below. For the moment, semantic node construction may be understood with reference to FIG. 6, in which a node for each of the values in the PC is created for each node in the IUN set. Thus, when the PC is "animal" and the IUN set consists of the query root node QRN, a node for each of the values "ostrich" and "eagle" is created and attached to the QRN. The result is the construction of nodes 0, 1.0, and 1.1. Although this is the essence of semantic node construction, there are some important particularities with regard to the presently described embodiment of the invention and these will shortly be described with respect to FIG. 12.

After semantic node construction in step 1040, processing continues to step 1050.

In step 1050, a determination is made as to whether any more categories exist that have not been processed. In the present example, there are two categories that have not been processed (namely, the categories of "material" and "usage") and therefore processing follows the line marked "yes" to step 1060.

In step 1060, the next category is set as the PC (i.e., the category "material") and the IUN set is determined in step 1070 to be the lowest leaf nodes of all of the lowest level space cubes. In the present example, there is only one space cube (i.e., the space cube having nodes 0 as its space cube root node and nodes 1.0 and 1.1 as its space cube leaf nodes). The lowest leaf nodes of the lowest level space cubes thus are nodes 1.0 and 1.1. The IUN set therefore includes only nodes 1.0 and 1.1.

After step 1070, processing continues with step 1040 in which semantic node construction is performed for the category "material". The categories must be processed in the category order. Eventually, all of the categories will undergo semantic node construction and there will be no more categories to process at step 1050. At this point, processing follows the line marked "no" to step 1080.

In step 1080, each lowest level space cube leaf node is processed. This process is described in more detail with respect to FIG. 14, below, but for the sake of understanding it will be pointed out that this process basically means attaching the infoelement objects as nodes, or nodes representing the infoelement objects, to the bottom of the tree.

Semantic node construction for a given category PC and a given IUN set will now be described using FIG. 12.

In FIG. 12, processing begins with step 1200. In step 1210, the first one of the nodes in the IUN set is selected as the present IUN. In step 1220, the first value of the present category PC is selected as a present value PV.

In step 1230, an upward path of nodes UPN from the present IUN to the query root node QRN is identified. To explain, assume that the present category PC is "usage" and the IUN set consists of nodes 2.0, 2.1, 2.2, 2.3, and 2.4. Further assume that the present IUN is node 2.0 and the present value PV is "decoration". In step 1230, an upward path of nodes UPN from the present IUN (i.e., node 2.0) to the QRN (i.e., node 0) is identified. In this case, the upward path of nodes UPN would include nodes 2.0, 1.0, and 0.

In step 1240, and upward value set UVS is determined. The UVS has a respective node value for each of the nodes in the UPN. That is to say, for each of the nodes in the UPN, the UVS includes the value attributed to the node. In the present example, node 2.0 is attributed with the value "feather". Node 1.0 is attributed with the value "ostrich". Node 0 has no particular value. Thus, the upward value set UVS determined in step 1240 in the present example would include (feather, ostrich).

In step 1250, a check and match search is conducted for infoelement objects having an attributed category-value of the present value PV and also each value in the upward value set UVS. In the present example, this means that a search is made to determine whether there is at least one infoelement object that has a category-value of "decoration" (i.e., the PV) and also has category-values for each value in the UVS, namely, "feather" and "ostrich". Returning to FIG. 5, it is clear that there is no query result having information pertaining to all three of these terms, and therefore there would be no infoelement object that has all three of these category-values attributed to it.

In the present example, the determination made at step 1260 as to whether at least one such infoelement object exists is negative, and therefore processing follows the line marked "no" to step 1290. In other words, steps 1270 and 1280 are not performed when there are no infoelement objects that would end up being attached to a node having a node value of "decoration" if such a node were attached to node 2.0. Steps 1270 and 1280 will be discussed below.

In step 1290, a determination is made as to whether there are any more values in the PC that have not been processed. In the present case, there are three more values that have not been processed (i.e., "ornament", "adornment", and "embellishment"). Therefore, processing follows the line marked "yes" to step 1300. In step 1300, the next value in the present category ("ornament") is set as the present value PV and processing moves on to step 1230.

In the present example, the upward path of nodes UPN from the present IUN to the QRN has not changed and remains at nodes 2.0, 1.0, and 0. At step 1240, the upward value set UVS also has not changed. At step 1250, a search is conducted for infoelement objects having attributed category-values of the present value PV (i.e., "ornament") and also each value in the UVS (i.e., "feather" and "ostrich").

In step 1260, a determination is made as to whether at least one such infoelement object was found. Referring to FIG. 5, it can be seen that query result 900 contains information relating to "ostrich", "feather", and "ornament". Therefore, there would have been created an infoelement object containing category-values of (animal/ostrich), (material/feather), and (usage/ornament). Thus, the determination in 1260 is affirmative and processing follows the line marked "yes" to step 1270.

At step 1270, a node is created and attached to the present IUN ("PIUN"). In the tree shaped hierarchy shown in FIG. 6, this node would be node 3.0. In step 1280, the thus-created node is attributed the present value PV. Thus, node 3.0 is attributed the value "ornament". Processing continues with step 1290 as described above.

After the processing of the value "embellishment", the processing and step 1290 will determine that there are no more values for the present category PC. At this point, processing will follow the line marked "no" to step 1310. To review, at this point and processing the PC is still "usage", the IUN set still includes nodes 2.0–2.4, the present IUN is still node 2.0, and the present value PV is "embellishment".

In step 1310 it is determined whether the fanout of the present IUN (i.e., node 2.0) exceeds a threshold. The threshold mentioned in step 1310 is a semantic threshold. This semantic threshold, in the presently preferred embodiment, is 9. During this example, however, it will be assumed that the semantic threshold is 7 so as to simplify the explanation at least somewhat. The determination in step 1310 thus is whether the fanout of node 2.0 is greater than 7. As FIG. 6 shows, the fanout of node 2.0 is only one. Since the fanout of the present IUN is not greater than the threshold, processing continues along the line marked "no" to step 1330.

If the fanout of the present IUN had been greater than the threshold, processing would have continued along the line marked "yes" to step 1320. In step 1320, processing involves an operation of space cube restructuring for the space cube that has the present IUN as its space cube root node. Space cube restructuring is described with regard to FIG. 13 in detail below. Space cube restructuring, in brief, is an operation that reduces the fanout of a space cube root node by detaching space cube leaf nodes from the space cube root node and substituting a new space cube leaf node to which the detached space cube leaf nodes are re-attached.

After space cube restructuring is completed in step 1320, processing continues on to step 1330.

In step 1330, it is determined whether there are more immediately upward nodes in the IUN set that have not been processed. In the present example, the only member of the IUN set that has been processed is node 2.0. Still to be processed in the IUN set are nodes 2.1, 2.2, 2.3, and 2.4. Therefore, the determination at step 1330 is in the affirmative and processing follows the line marked "yes" to step 1340. In step 1330, if there had been no more members in the set of immediately upward nodes to process, then processing would have followed the line marked "no" to step 1350. At step 1350, the semantic node construction for the PC and its IUN set is completed.

Returning up to step 1340, which is reached in the event that there are more immediately upward nodes in the IUN set to process, the next member of the IUN set is set as the present IUN. In the present example, the processing of step 1340 would result in the designation of node 2.1 as the present IUN. With this change, processing would continue on to step 1220.

In step 1220, the present value PV would be set to "decoration". In step 1230, the UPN would be identified as nodes 2.1,1.0, and 0. In step 1240, the UVS would be determined as including ("quill", "ostrich").

Processing would continue as shown in FIG. 12. As described, semantic node construction includes a feature whereby a node is not created when there are no infoelement objects that would ever be attached to such a node. This feature is not strictly necessary, but is advantageous in that it contributes to efficiency. Also as described, semantic node construction includes an operation of space cube restructuring whenever there is a node that has a fanout that exceeds the semantic threshold. Space cube restructuring, depicted in FIG. 13, will be explained by way of an example after the description of how the infoelement objects are attached to the tree as leaf nodes.

The overall operation of semantically structuring the query results shown in FIG. 11 includes a step 1080 of processing leaf nodes. One way of implementing the step 1080 is shown in FIG. 14 in more detail.

In FIG. 14, the process begins with step 1600. By the time processing reaches step 1600, a root node QRN (i.e., node 0) has been created, and there has been created a set of intermediate nodes (i.e., nodes 1.0–3.9 in the example of FIG. 6 and the query results of FIG. 5). The intermediate nodes do not represent any particular hit or query results, but represent semantics derived from the semantic structuring information 310. Therefore, after all of the intermediate nodes have been created, there will be a set of intermediate nodes that are the lowest level of all of the leaf nodes attached to the tree shaped hierarchy. In the example of FIG. 6, the lowest level leaf nodes of the tree shaped hierarchy include nodes 3.0–3.9. It will not always be the case that the lowest level leaf nodes are all on the same level.

For instance, it may happen that, due to the semantic structuring information, quite a few values corresponds to a given category. One example of this might occur if the user had entered "decor*" for a value of the category "usage" instead of entering "decoration". The many variations on the word stem "decor*" could result in a fanout being greater than the semantic threshold. In such a case, as will become clearer below after the explanation of space cube restructuring, some of the nodes would be detached and re-attached at a lower level. Therefore, the set of leaf nodes being processed in FIG. 14 is the set of lowest level leaf nodes that are intermediate nodes, regardless of the distance between the lowest level leaf node and the query root node QRN. It will also be understood that these lowest level leaf nodes will have been created during the semantic node construction of the category that was last according to the category order.

In step 1610, the first of the lowest level leaf nodes is set as the present node PN. The order in which the lowest level leaf nodes are processed is not especially important. For the sake of simplicity, it will be assumed that node 3.0 is the first lowest level leaf node in this explanatory example.

In step 1620, the infoelement objects related to the present node are identified. The infoelement objects related to the present node PN will be those that have category-values that are equivalent to the attributed node value of the present node PN and also to each of the nodes in the immediately upward node IUN set of the PN. Thus, when node 3.0 is the PN, the IUN set includes nodes 2.0, 1.0, and 0. For an infoelement object to be related to node 3.0, it must include category-values equivalent to "ornament", "feather", and "ostrich". In the exemplary query results of FIG. 5, there are two query results that would have infoelement objects with the appropriate category-values, namely, results 900 and 901.

In step 1630, the PN is defined as a space cube root node, and in step 1640 the related infoelement objects are attached to the PN as space cube leaf nodes. In FIG. 6, query result 900 has a corresponding infoelement object 4.0; query result 901 has a corresponding infoelement object 4.1. These two infoelement objects thus are attached to node 3.0 in step 1640.

It will be appreciated that node 3.0, node 4.0, and node 4.1 together constitute a space cube with node 3.0 as the space cube root node and nodes 4.0 and 4.1 as the space cube leaf nodes.

In step 1650 it is determined whether the fanout of this space cube root node (i.e., the PN) exceeds the semantic threshold T. If the fanout does exceed the semantic threshold, then processing continues along the line marked "yes" to step 1660; if the fanout does not exceed the semantic threshold, then processing continues along the line marked "no" to step 1670.

Step 1660 involves space cube restructuring for the space cube that includes the PN as the space cube root node. This will be described shortly.

In step 1670, a determination is made as to whether there are more of the lowest level leaf nodes that have not yet been processed. In the present example, nodes 3.1–3.9 have not been processed. Therefore, step 1670 makes a determination in the affirmative and processing continues along the line marked "yes" to step 1680. If, on the other hand, all of the lowest level leaf nodes had been processed, processing would continue along the line marked "no" to step 1690, the conclusion of the processing of the leaf nodes.

In step 1680, the next one of the lowest level leaf nodes is set as the PN. Processing then continues with step 1620, in which the infoelement objects related to the PN are identified.

By virtue of the process depicted in FIG. 14, the query results represented by infoelement objects are attached to the appropriate locations in the tree shaped hierarchy. It would be not unusual to have a single query result that relates to more than one of the lowest level leaf nodes. To maintain a perfect tree structure, it would of course be possible in such a case to create a duplicate infoelement object for each instance in which an infoelement object must be attached to more than one of the lowest level leaf nodes. The maintaining of a perfect tree structure is not, however, deemed always to be essential in the practice of the presently preferred embodiment. In some cases, it would not be inappropriate to attach a given infoelement object to more than one of the lowest level leaf nodes.

The preferred approach, although not strictly essential, is the maintaining the appearance of a perfect tree structure in the user display by apparently duplicating infoelement objects as necessary, while actually storing the infoelement objects only once and using pointers to them.

Space cube restructuring will now be described with reference to FIG. 13. In this discussion, FIG. 6 will not be used and, instead, FIGS. 7, 16, and 17 will be used.

FIG. 7 is different from FIG. 6 in that FIG. 6 truly relates, at all of its levels, to the query results depicted in FIG. 4. FIG. 7 relates to the query results depicted in FIG. 5. To explain, the query results of FIG. 5 show a case in which 17 infoelement objects relate to one of the lowest level leaf nodes (i.e., the infoelement objects relating to query results 902–918 all relate to node 3.1). Therefore, when leaf node 3.1 is being processed as in the process depicted in FIG. 14, step 1650 checks whether the fanout of node 3.1 is greater than the semantic threshold. The fanout of node 3.1 is 17; the semantic threshold is 7 in this example. Therefore, the fanout of the present node PN is greater than T and processing continues to step 1660 from step 1650. Step 1660 results in invoking the space cube restructuring process where the PN (i.e., node 3.1) is the space cube root node.

FIG. 16 shows node 3.1 and 17 infoelement objects 4.2–4.18, each of which infoelement objects relates to a corresponding one of query results 902–918. These nodes, together, are a space cube with node 3.1 as the space cube root node.

Space cube restructuring begins with step 1400 shown in FIG. 13. In step 1410, a value for the space cube root node weight SCRNW is set to zero. In step 1420, the first space cube leaf node is selected as the present leaf node LN. In this example, node 4.2 will be considered to be the first space cube leaf node.

In step 1430, the leaf node weight LNW for the present LN is determined. It has already been explained that each infoelement object has a respective infoelement object weight. Although it is foreseen that the LNW may be different from the infoelement object weight, it is sufficient for the present example that the infoelement object weight, which is based on its relevance score, is used as the LNW. FIG. 16 shows each individual LNW (i.e., infoelement object weight) for each of the 17 infoelement objects 4.2–4.18. That is, node 4.2 has a LNW of 53; node 4.3 has a weight of 24; and so on.

In step 1440, the space cube root node weight SCRNW is incremented by the LNW of the present LN. In step 1450, a determination is made as to whether there are more leaf nodes in the space cube that have not been processed. When this determination is in the affirmative, processing continues along the path marked "yes" to step 1460. In step 1460, the next leaf node is set as the present LN and processing continues on to step 1430.

Once all the leaf nodes in the space cube have been processed and step 1470 is reached, the space cube root node weight SCRNW equals the aggregate weights of all the space cube leaf nodes (i.e., 798). In step 1470, a balanced branch weight BBW is determined as a function of the space cube root node weight SCRNW and the semantic threshold T. Although other approaches may be used without departing from the spirit of this embodiment of the invention, the following formula may be used to determine the balanced branch weight.

$$BBW = \frac{SCRNW}{T-1}$$

In this present example, therefore, the balanced branch weight BBW is approximately equal to 133.

Processing continues on with step 1480, in which each leaf node having a respective LNW of less than the BBW is detached. Thus, all of the leaf nodes 4.2–4.18 would be detached from node 3.1 at this step.

In step 1490, the detached leaf nodes are lexically ordered. Lexical ordering can be accomplished in a number of different ways. Since all of the nodes 4.2–4.18 have in common the information "ostrich", "quill", and "decoration", the additional meta-information must be used. Meta-information, as already mentioned, can include keyword information, meta tag information, or information from the content of the page or record. Similarly, meta-information could include URL information or whatever the designer of the system or the user of the system determines would be helpful. In the query results shown in FIG. 5, each of the hits 902–918 has a keyword associated with it. In the present example, therefore, keywords are used as the meta-information that is to be the basis for lexically ordering the leaf nodes. To put it another way, the leaf nodes are alphabetized to according to their keywords.

Step 1490 does not require any changes to the order of nodes 4.2–4.18 in the present example, because they happened to be already in alphabetical order according to keyword. Processing continues from step 1490 to step 1500.

In step 1500, the detached leaf nodes are accumulated in order until a combined LNW for the accumulated nodes is approximately equal to the balanced branch weight BBW or until there are no more detached leaf nodes. As can be seen from the example in FIG. 16, nodes 4.2, 4.3, 4.4, and 4.5 have a combined weight of 115. This is approximately equal to the balanced branch weight of 133 (or, at least, closer to the balanced branch weight 133 then it would be if node 4.6 were also accumulated). Thus, these four nodes 4.2–4.5 constitute accumulated leaf nodes.

In step 1510, a new leaf node is created and attached to the space cube root node 3.1. The new leaf node is shown in FIG. 17 as new leaf node 3.11. In step 1520, the accumulated leaf nodes 4.2–4.5 are attached to the new leaf node 3.11.

In step 1530, the new leaf node is attributed with a respective node value. The respective node value for the new leaf node is a lexical value based on the leaf nodes that were attached to it in step 1520. In the present example, the first of the keywords in the leaf nodes began with the letter "a" and the last of the keywords in the leaf nodes began with "be". Therefore, node 3.11 is attributed, as a respective node value, the lexical value of "a–be".

In step 1540, it is determined whether the fanout of the new leaf node is greater than the semantic threshold. In the present case, the fanout of the new leaf node 3.11 is only 4 and does not exceed the semantic threshold T. If, however, the fanout of the new leaf node was still greater than the semantic threshold T, processing would continue to step 1550. In step 1550, the present space cube restructuring process would be recursively called with the new leaf node as the space cube root node.

Since the fanout of new leaf node 3.11 is not greater than the semantic threshold, processing follows the line marked "no" to step 1560. In step 1560, a determination is made as to whether there are more detached leaf nodes to process. In the present example, detached leaf nodes 4.6–4.18 have not yet been processed. Because these nodes have not been processed, processing follows the line marked "yes" back to step 1500.

In step 1500, the detached leaf nodes are accumulated in order until a combined leaf node weight LNW is approximately equal to the BBW of 133. In the present example, nodes 4.6–4.8 are accumulated for a total LNW of 155. 155 is greater than the BBW of 133, but is closer to 133 than it would have been if only nodes 4.6 and 4.7 had been accumulated.

Thus, a new leaf node 3.12 is created for nodes 4.6–4.8 and attached to the space cube root node 3.1; nodes 4.6–4.8 are attached to the new leaf node 3.12; and the new leaf node 3.12 is attributed with a lexical value based on the values of the attached leaf nodes 4.6–4.8 (i.e., "bu–cot").

Eventually, after the attachment of nodes 4.16 and 4.17 to new leaf node 3.16, there is only one detached leaf node remaining, namely, node 4.18. At step 1500, detached leaf nodes are accumulated until the combined LNW is approximately equal to the BBW or until no more detached leaf nodes exist. When node 4.18 is accumulated, no more detached leaf nodes exist and therefore processing continues on with steps 1510–1540 as already explained above. The finished result of space cube restructuring according to FIG. 13 is shown in FIG. 18.

It should be pointed out that FIG. 17 and FIG. 18 differ in what is shown as the fanout of node 3.1. FIG. 18 shows the fanout of new leaf nodes 3.11–3.17. FIG. 17 illustrates a different embodiment with respect to the final node 4.18. In the embodiment shown in FIG. 17, when the number of accumulated leaf nodes is only 1, the creation of a new leaf node in step 1510 is skipped (i.e., node 3.17 is not created) and the accumulated leaf node (4.18 in this example) is re-attached to the space cube root node (node 3.1). The embodiment shown in FIG. 17 would require only a slight modification to the flow diagram of FIG. 13.

After the processing of the detached leaf node 4.18 and its attachment to a new leaf node 3.17 (not shown) or its re-attachment to the space cube root node 3.1 (as shown in FIG. 17) depending upon the embodiment, the determination at step 1560 is that there are no more detached leaf nodes to be processed. Therefore, processing follows the line marked "no" to step 1570.

It will be appreciated that the space cube restructuring operation shown in FIG. 13 is also appropriate to use when the fanout of one of the intermediate nodes is greater than the semantic threshold but the nodes being attached to the particular intermediate node are not infoelement objects but other intermediate nodes. For example, if the value for the category "usage" had been "decor*" instead of "decoration", it might be expected that there could be quite if you nodes at level 740 that would have to be attached to, for example, node 2.1. The fanout of node 2.1 would thus the greater than the semantic threshold T, and space cube restructuring would be required for the space cube having node 2.1 as the space cube root node (see FIG. 12, step 1320).

In such a case, in step 1430, the LNW of each of the nodes to be attached to node 2.1 would not simply be the infoelement object weight of a single infoelement objects, but would be the cumulative weight of all the infoelement objects relating to the particular node to be attached to node 2.1. In other words, for the space cube having node 2.1 as the space cube root node, a respective relevant set of infoelement objects is identified for each of the space cube leaf nodes of the space cube. The relevant set of infoelement objects are those infoelement objects having attributed category-values that are equivalent to the value of the particular space cube leaf node and also all of the values of the intermediate nodes in an upward path from the space cube leaf node to the QRN.

On the other hand, when the space cube being restructured has space cube leaf nodes that are themselves infoelement objects, it can be said that the relevant set of infoelement objects for any given space cube leaf node is the set consisting of only that infoelement object. Thus, the term relevant set of infoelement objects does not imply more than one object.

It will be understood that the SCRNW represents an overall weight that includes the respective LNWs for the space cube leaf nodes, and that each LNW is based on the respective weights of the infoelement objects in the respective relevant set (although sometimes there is only one actual infoelement object in that set).

It will also be understood that, the term "detached" is used for linguistic convenience. There is no actual need that a space cube leaf node be unattached. In other words, it is perfectly acceptable if a new leaf node is created and the leaf nodes referred to as being "detached" are actually just transferred to the new leaf node without any period during which the leaf node being transferred is not attached to the tree. That is to say, the concept of "detached" is more of a logical one than a physical one.

The result of the operations described above is a semantically structured tree that has a root node and intermediate nodes. The intermediate nodes are ranged in layers, although space cube restructuring might result in an increase in depth in some of the layers. The layers correspond to the semantic structuring information. That is to say, the first layer of intermediate nodes corresponds to the heaviest weighted category, and the nodes themselves in the first layer correspond to the values supplied for that category. The lowest level of leaf nodes in the semantically structured tree is the level of the infoelement objects that represent query results. The actual implementation of using infoelement objects to represent query results or some other computer implementation is not strictly important. The important point is that the lowest level of leaf nodes represent the query results. As was illustrated in FIGS. 16 and 17, the lowest layer of query results may have an increased depth due to space cube restructuring operations. In the end, however, each of the leaf nodes is attached to the tree based on an uptree relation with the values attributed to the nodes in an upward path to the root node. Because of space cube restructuring, the tree has an overall space cube structure that is balanced so as to have a number of space cube leaf nodes in each space cube that is constrained by the semantic threshold.

The semantically structured and semantically balanced tree-shaped hierarchy shown in FIG. 18 can be transmitted or stored in any number of ways. FIG. 19 shows an example of a data structure for sending information relating to a semantically structured and semantically balanced tree-shaped hierarchy.

In particular, reference numeral 2000 refers to a root node structure. The root node structure describes the fanout of the QRN with respect to the tree-shaped hierarchy of FIG. 18.

Reference numeral 2010 refers to examples of an intermediate node structure. The intermediate node structure includes information relating to fanout, category, and value.

Reference numeral 2020 refers to an example of an infoelement structure. The infoelement structure includes information relating to the location of the hit (i.e., the URL when the information is from a web page), the infoelement object weight, the attributed category-values, and any meta-information such as meta-tags, keywords, and the like.

Turning now to FIG. 15, consideration will be given to an implementation of the just-described method of managing query result complexity.

In FIG. 15, 410 indicates a network such as the Internet; 420, 435, 440, and 460 indicate various servers that interface with the network 410; 430 indicates a terminal of a user (also referred to as a user station, user terminal, or client terminal), 450 indicates a structured database, and 470 indicates a non-structured database such as a website. User terminal 430 is connected to a user server 435. The user server 435 may be a server of a local area network to which the user terminal 430 is connected. The user server 435 may also be an Internet service provider (ISP) to which the user terminal 430 connects via a modem connection or the like.

More particularly, a user accesses a search application running on server 420 using terminal 430. The search application on server 420 could be hosted on terminal 430, but in the present simplified example the software comprising the search application happens to reside on server 420. The search application includes a component which interfaces with the terminal 430 so as to display on the terminal a graphical user interface such as that shown in FIGS. 1 and 3.

The search application server 420 interfaces with the network 410 (which will be referred to as the Internet for the sake of this example).

The servers 440 and 460 also interface with the Internet. These servers are intended to be representative only, and it is envisioned that there might be many different servers located worldwide. Server 440 provides access to the structured database 450. The particular location of structured database 450 is not important, and it will be appreciated that the structured database 450 could equally well be hosted by server 420 or server 460.

Server 460 provides access to a non-structured database 470 which will be referred to as a website for the purposes of this example. The non-structured database 470 includes a plurality of pages, typically in HTML. The particular location of the HTML pages 470 is not important, and they could equally well be hosted on either of servers 420 or 440.

In general, a user at station 430 completes a form such as shown in FIG. 3, and enters semantic structuring information for the categories using category entry areas 210, for the weights using weight entry regions 220 and slider bars 230, and for the values using value entry regions to 40. This information is provided via server 435 through Internet 410 to search application server 420. The search application server 420 takes care of creating a query using Boolean or other terms such as ((ostrich OR eagle) AND (feather OR plume OR quill) AND (decoration OR ornament OR adornment OR embellishment)). The search application server 420 also takes care of sending the query through the Internet 410 to one or more search engines or database managers. The search application server 420 also takes care of receiving information as to hits and collecting such information, and putting it in the form that is expected.

The creation of the semantically structured tree shaped hierarchy with balanced space cubes can take place at the search application server 420, the user server 435, or the user station 430. In FIG. 15, the search application server 420 receives the semantic structuring information input by the user. The search application server 420 generates the query and receives the query results. The search application server 420 can then pass on the semantic structuring information and query results information as a data structure 300 to another application located on search application server 420 or another server. A semantic node structuring application, hosted on server 420 in this example, receives the semantic structuring and query results information as data structure 300 and undertakes the process shown in FIG. 8.

After carrying out the process shown in FIG. 8, the semantic node structuring application produces data structures 2000–2020 and provides them (all at once, one at a time, or as needed) to a user interface application operating at the user station 430 or the user server 435.

The user interface application may be implemented in a variety of ways. The related application entitled "PRESENTATION OF HIERARCHICAL QUERY RESULT DATA USING MULTIPLE DEGREES OF FREEDOM" and referenced at the beginning of this application describes an important and inventive system and manner of presenting query result data that is in the form of a semantically structured and semantically balanced tree shaped hierarchy. It is sufficient for the purposes of this application to point out that a user interface operating according to the embodiments described herein will typically display a number of user selectable interface areas that is approximately equal to the predetermined semantic threshold.

Thus, for example, the tree shaped hierarchy shown in FIG. 18 might be presented, a space cube at a time, in a display area 200 such as that shown in FIG. 1. The user interface may also provide information that indicates to a user where in the tree the user has come from in order to arrive at the present location for which a space cube is being displayed. Of course, the space cube can be displayed in a variety of attractive ways without departing from the spirit and scope of the presently preferred embodiments.

What is claimed is:

1. A method of managing query result complexity for a set of query results of a query, said query having corresponding semantic structuring information including: categories, each category having a corresponding category weight, each category having corresponding values, said categories having a category order based on said corresponding category weight, said method comprising:
   (1) determining a semantic threshold;
   (2) for each query result:
      (2a) building an infoelement object;
      (2b) based on the content of said query result, attributing to said infoelement object:
         (2b1) a plurality of attributed category-values, each said attributed category-value corresponding to one of said categories,
         (2b2) additional meta-information associated with said query result, and
         (2b3) a respective weight, based on at least said additional meta-information, as an infoelement object weight;
   (3) semantically structuring said query results in a tree-shaped hierarchy, including:
      (3a) creating a root node;
      (3b) setting as a present category the one of said categories first according to said category order, and setting as a set of immediately upward nodes said root node;
      (3c) performing semantic node construction for said present category, comprising:
         (3c1) for each value of said values corresponding to said present category:
            (3c1a) for each immediately upward node in said set of immediately upward nodes:
               (3c1a-i) identifying an upward path of nodes from said immediately upward node up to said root node;
               (3c1a-ii) making a determination as to whether there exists at least one of said infoelement objects having one of said attributed category-values equivalent to a respective attributed node value of each of said said nodes in said upward path;
               (3c1a-iii) when said determination indicates existence, creating a node attached to said immediately upward node;
               (3c1a-iv) attributing to said node thus created said value of said values corresponding to said present category as said respective attributed node value;
               (3c1a-v) defining a space cube with a space cube root node and space cube leaf nodes, wherein said immediately upward node is said space cube root node, and each said node created and attached to said node immediately upward is one of said space cube leaf nodes;
               (3c1a-vi) determining, as a space cube fanout of said space cube root node, the number of space cube leaf nodes attached to said space cube root node; and
               (3c1a-vii) when said space cube fanout exceeds said semantic threshold, performing a space cube restructuring operation to reduce said space cube fanout to or below said semantic threshold; and then
      (3d) in said category order:
         (3d1) setting as said present category, in turn, each of said categories other than said category first according to said category order;
         (3d2) setting as said set of immediately upward nodes each lowest level space cube leaf node; and
         (3d3) performing said semantic node construction for said present category; and then
      (3e) for each lowest level said space cube leaf node defined in said semantic node construction of the one of said categories last according to said category order:
         (3e1) identifying, as related infoelements, all of said infoelement objects comprising attributed category-values equivalent to the respective attributed node values of said lowest level space cube leaf node and said nodes in said upward path;
         (3e2) defining said lowest level space cube leaf node as a space cube root node having, as respective space cube leaf nodes said related infoelements;
         (3e3) determining said respective space cube fanout; and
         (3e4) when said respective space cube fanout exceeds said semantic threshold, performing said space cube restructuring operation to reduce said respective space cube fanout to or below said semantic threshold;
   wherein said space cube restructuring operation comprises:
      (I) identifying, for each of said space cube leaf nodes, a respective relevant set of infoelement objects comprising ones of said infoelement objects having one of said attributed category-values equivalent to a respective attributed node value of each of said space cube leaf node and of said nodes in said upward path;
      (II) determining, for each said space cube leaf node, a respective leaf node weight based on the respective weights for said infoelement objects in said respective relevant set;
      (III) determining, for said space cube root node, an overall weight including said respective leaf node weights for each said respective relevant set of infoelements;
      (IV) determining a balanced branch weight as a function of said overall weight and said semantic threshold;
      (V) until said space cube fanout meets said semantic threshold:
         (V-1) detaching ones of said space cube leaf nodes having said respective leaf node weight less than said balanced branch weight from said space cube root node to provide detached space cube leaf nodes;
         (V-2) determining a combination of said detached space cube leaf nodes having a combined weight of approximately said balanced branch weight;
         (V-3) attaching to said space cube root node a new space cube leaf node representing said combination of said detached space cube leaf nodes; and (V-4) defining one of said space cubes having said new space cube leaf node as a new space cube root node thereof, and said combination of said detached space cube leaf nodes as said space cube leaf nodes thereof; and then (V-5) when said space cube fanout of said space cube thus defined exceeds said semantic threshold, performing said space cube restructuring operation to reduce said space cube fanout to or below said semantic threshold;

wherein, when said new space cube root node is defined during said space cube restructuring operation, said new space cube root node is attributed with a corresponding attributed node value based on a lexical function of said combination of detached space cube leaf nodes.

2. A method of managing query result complexity for a set of query results of a query, said query having corresponding semantic structuring information including: categories, each category having a corresponding category weight, each category having corresponding values, said categories having a category order based on said corresponding category weight, said method comprising:

determining a semantic threshold;

for each query result, building an infoelement object with attributes comprising:
corresponding category-values,
additional meta-information, and
a respective weight, based on at least said additional meta-information, as an infoelement object weight;

semantically structuring said query results in a tree-shaped hierarchy of space cubes on the basis of said corresponding category-values, including performing semantic node construction for each of said categories in said category order, wherein space cube restructuring is performed when a space cube fanout of one of said space cubes exceeds said semantic threshold;

wherein a new space cube root node defined during said space cube restructuring is attributed with a corresponding attributed node value based on a lexical function of ones of said set of query results having an uptree relation to said new space cube root node.

3. A method of managing query results, comprising:
receiving said query results;
receiving semantic structuring information;
defining a root node corresponding to a query;
creating a semantically structured tree comprising said root node and intermediate nodes in layers, said intermediate nodes being arranged in said layers according to said semantic structuring information, said tree further comprising lowest level leaf nodes corresponding to ones of said query results, each of said leaf nodes being attached on the basis of an uptree relation;
wherein said tree has a space cube structure balanced on the basis of a semantic threshold.

4. The method of managing query results as set forth in claim 3, wherein said semantic threshold is 9.

5. A computer system for managing query results, comprising:
a processor;
a memory under control of said processor, and storing instructions adapted to enable said processor to perform steps of:
receiving said query results;
receiving semantic structuring information;
defining a root node corresponding to a query;
creating a semantically structured tree comprising said root node and intermediate nodes in layers, said intermediate nodes being arranged in said layers according to said semantic structuring information, said tree further comprising lowest level leaf nodes corresponding to ones of said query results, each of said leaf nodes being attached on the basis of an uptree relation;
wherein said tree has a space cube structure balanced on the basis of a semantic threshold.

6. The computer system for managing query results as set forth in claim 5, wherein said semantic threshold is 9.

7. A computer program product for implementing a method of managing query results, comprising:
a computer readable medium, and
instructions on said computer readable medium, adapted to enable a computer to implement the steps of:
receiving said query results;
receiving semantic structuring information;
defining a root node corresponding to a query;
creating a semantically structured tree comprising said root node and intermediate nodes in layers, said intermediate nodes being arranged in said layers according to said semantic structuring information, said tree further comprising lowest level leaf nodes corresponding to ones of said query results, each of said leaf nodes being attached on the basis of an uptree relation;
wherein said tree has a space cube structure balanced on the basis of a semantic threshold.

8. The computer system for managing query results as set forth in claim 7, wherein said semantic threshold is 9.

9. A computer-readable data structure for sending semantic structuring information, comprising:
a user information section;
a semantic structuring section; and
a query results section;
wherein said semantic structuring section includes information relating to categories, corresponding category weights, and a plurality of corresponding values for one of said categories; and
wherein said semantic structuring section is adapted to enable a computer system to perform an operation for creating a semantically structured tree shaped hierarchy of the results in said query results section, balanced according to a predetermined semantic threshold.

10. A search application server, comprising:
a processor;
a memory under control of said processor, and storing instructions adapted to enable said processor to perform steps of:
receiving semantic structuring information;
creating and sending a query based on said semantic structuring information;
receiving query results related to said query;
processing said query results, based on said semantic structuring information, to produce a semantically structured tree shaped hierarchy balanced on the basis of a predetermined semantic threshold; and
sending root node, intermediate node, and infoelement data structures based on said tree shaped hierarchy.

* * * * *